US012633990B2

(12) United States Patent
Li et al.

(10) Patent No.: US 12,633,990 B2
(45) Date of Patent: May 19, 2026

(54) BEAM PAIRING BASED ON PRIORITY AND INTERFERENCE

(71) Applicant: SAMSUNG ELECTRONICS CO., LTD., Suwon-si (KR)

(72) Inventors: Yan Li, Beijing (CN); Huiyang Wang, Beijing (CN); Meifang Jing, Beijing (CN); Jiajia Wang, Beijing (CN); Yi Zhao, Beijing (CN); Xiaohui Yang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 348 days.

(21) Appl. No.: 18/317,449

(22) Filed: May 15, 2023

(65) Prior Publication Data

US 2024/0088976 A1      Mar. 14, 2024

Related U.S. Application Data

(63) Continuation of application No. PCT/KR2023/005713, filed on Apr. 26, 2023.

(30) Foreign Application Priority Data

Sep. 9, 2022      (CN) .......................... 202211105528.6

(51) Int. Cl.
*H04B 7/06*          (2006.01)
*H04B 7/0408*          (2017.01)
(Continued)

(52) U.S. Cl.
CPC ......... *H04B 7/0695* (2013.01); *H04B 7/0408* (2013.01); *H04B 17/336* (2015.01)

(58) Field of Classification Search
CPC .. H04B 7/0695; H04B 7/0408; H04B 17/336; H04B 7/0452
See application file for complete search history.

(56) References Cited

U.S. PATENT DOCUMENTS 10,505,616 B1     12/2019   Chen et al.
10,666,342 B1      5/2020   Landis et al.
(Continued)

FOREIGN PATENT DOCUMENTS

CN          106211338          12/2016
WO        2017/095467           6/2017

OTHER PUBLICATIONS

Search Report and Written Opinion dated Jul. 26, 2023 issued in International Patent Application No. PCT/KR2023/005713.

*Primary Examiner* — Harry H Kim
(74) *Attorney, Agent, or Firm* — NIXON & VANDERHYE P.C.

(57) ABSTRACT

The disclosure relates to a method performed by an electronic device of a base station. The method includes: obtaining beam priority information of a plurality of beams for a plurality of user equipments (UEs); obtaining inter-beam interference information of the plurality of beams; identifying, based on the beam priority information and the inter-beam interference information, one of a plurality of beam pairing sets comprising two or more beams among the plurality of beams; and performing communication with at least one of the plurality of UEs via the identified beam pairing set.

19 Claims, 34 Drawing Sheets

(51) Int. Cl.
    *H04B 7/0452*      (2017.01)
    *H04B 17/336*      (2015.01)

(56)               References Cited

U.S. PATENT DOCUMENTS

| | | | |
|---|---|---|---|
| 10,980,028 B2 | 4/2021 | Sharma et al. | |
| 11,239,925 B2 | 2/2022 | Kim et al. | |
| 12,010,571 B2* | 6/2024 | Popescu | H04W 24/10 |
| 2016/0353467 A1* | 12/2016 | Nekovee | H04B 7/0408 |
| 2017/0238294 A1* | 8/2017 | Lim | H04L 5/0062 |
| | | | 370/277 |
| 2021/0028828 A1* | 1/2021 | Kurras | H04B 7/0413 |
| 2021/0127400 A1* | 4/2021 | Lin | H04W 72/541 |
| 2022/0109514 A1* | 4/2022 | Kim | H04B 7/0696 |
| 2022/0174654 A1 | 6/2022 | Horn et al. | |
| 2022/0200686 A1 | 6/2022 | Fodor et al. | |
| 2023/0090758 A1* | 3/2023 | Zhang | H04L 5/0094 |
| | | | 370/277 |

* cited by examiner acquiring user equipment (UE) distribution ⎯ S210 determining a beam priority of each of
a plurality of beams based on
the UE distribution ⎯ S220 selecting a scheduled beam among
the plurality of beams based on
the beam priority ⎯ S230 collecting the number of UEs in a
current cell within a preset period ~S310 determining whether the preset event
occurs, by determining whether
an absolute value of a difference
between the number of UEs collected in
the current period and the number of
UEs collected in a previous period is
greater than a first threshold value ~S320

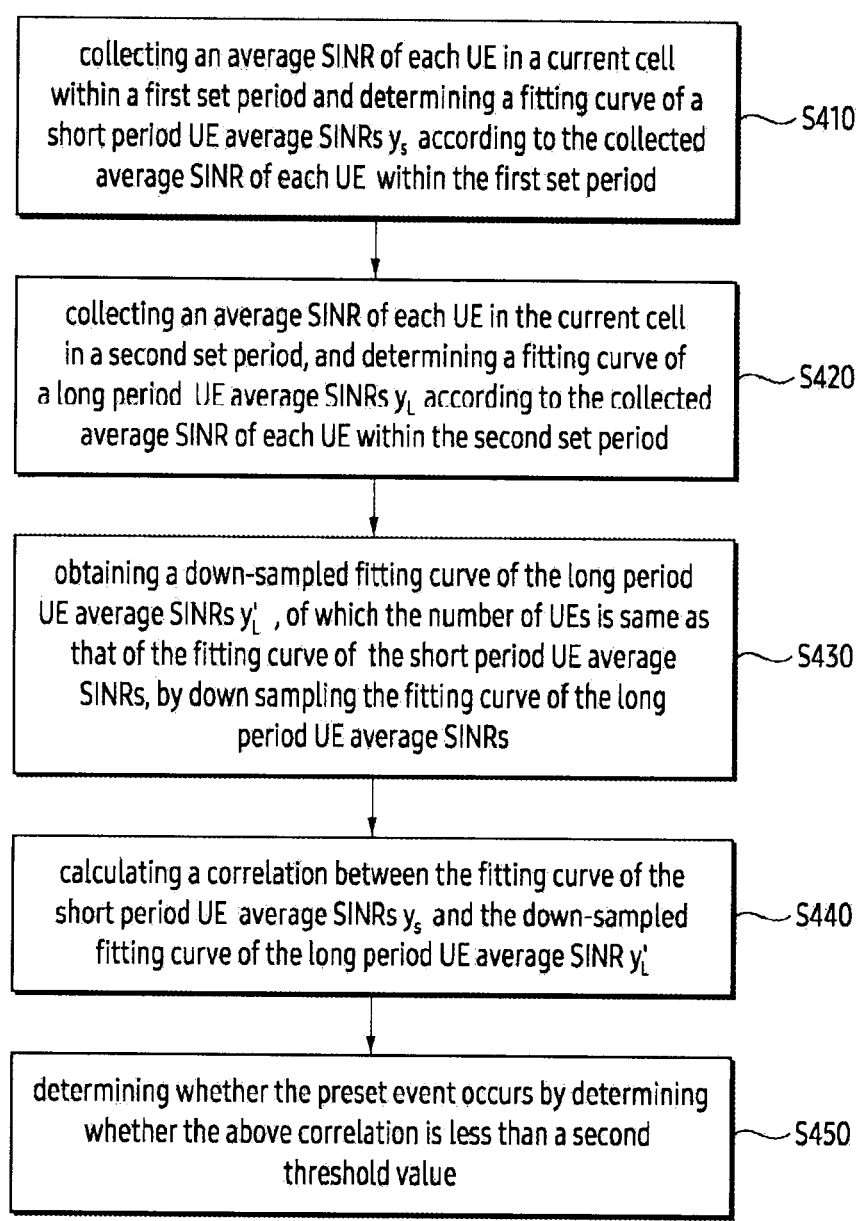

collecting an average SINR of each UE in a current cell within a first set period and determining a fitting curve of a short period UE average SINRs $y_s$ according to the collected average SINR of each UE within the first set period    S410 collecting an average SINR of each UE in the current cell in a second set period, and determining a fitting curve of a long period UE average SINRs $y_L$ according to the collected average SINR of each UE within the second set period    S420 obtaining a down-sampled fitting curve of the long period UE average SINRs $y_L'$, of which the number of UEs is same as that of the fitting curve of the short period UE average SINRs, by down sampling the fitting curve of the long period UE average SINRs    S430 calculating a correlation between the fitting curve of the short period UE average SINRs $y_s$ and the down-sampled fitting curve of the long period UE average SINR $y_L'$    S440 determining whether the preset event occurs by determining whether the above correlation is less than a second threshold value    S450

FIG. 4

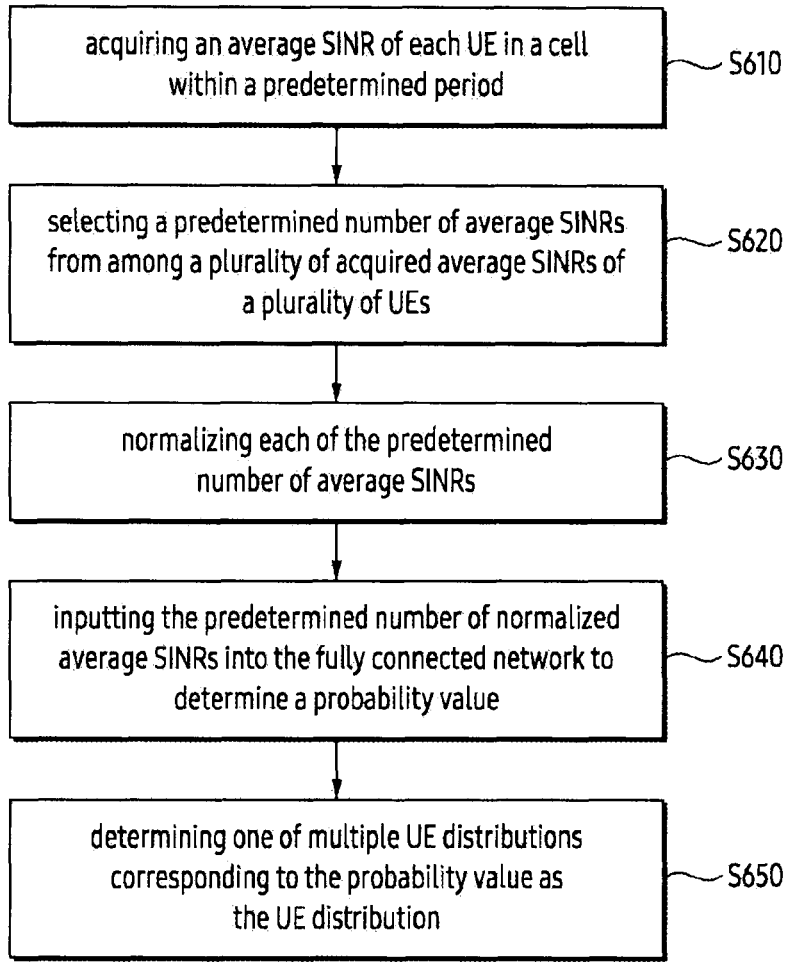

acquiring an average SINR of each UE in a cell within a predetermined period    S610 selecting a predetermined number of average SINRs from among a plurality of acquired average SINRs of a plurality of UEs    S620 normalizing each of the predetermined number of average SINRs    S630 inputting the predetermined number of normalized average SINRs into the fully connected network to determine a probability value    S640 determining one of multiple UE distributions corresponding to the probability value as the UE distribution    S650

FIG. 6

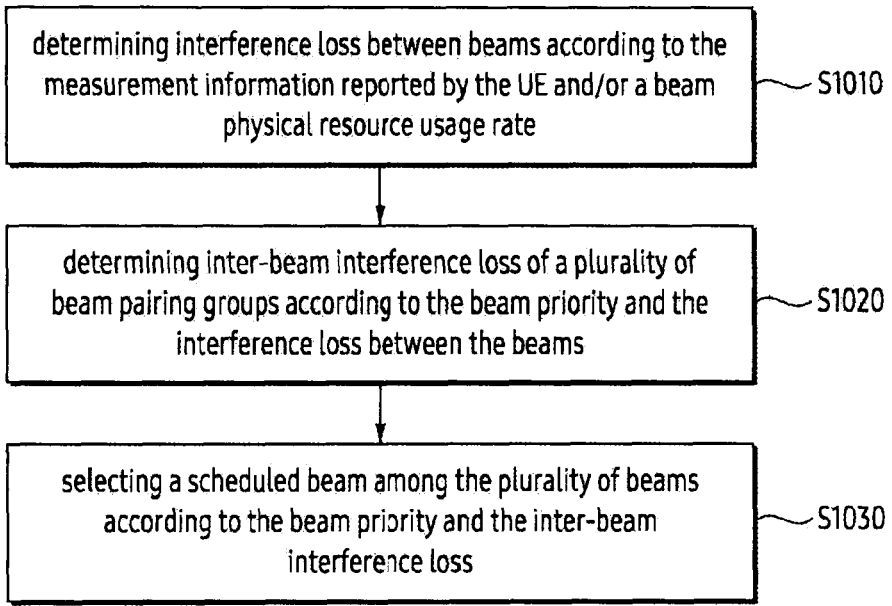

determining interference loss between beams according to the measurement information reported by the UE and/or a beam physical resource usage rate ⌒S1010 determining inter-beam interference loss of a plurality of beam pairing groups according to the beam priority and the interference loss between the beams ⌒S1020 selecting a scheduled beam among the plurality of beams according to the beam priority and the inter-beam interference loss ⌒S1030

FIG. 10 determine beam interference between beams according to the
measurement information reported by a UE — S1110 compensating the beam interference between the beams
according to a beam physical resource usage rate — S1120 determining the interference loss between the beams according
to the compensated beam interference — S1130 beam interference ob-
tained by interpolation beam interference calcu-
lated according to a in-
ter-beam interference
power reported by a UE signal power inter-beam interference
power that is not re-
ported by a UE $$\begin{bmatrix} L_{11} & \cdots & L_{1n} \\ \cdots & \cdots & \cdots \\ L_{n1} & \cdots & L_{nn} \end{bmatrix}$$

FIG. 12C

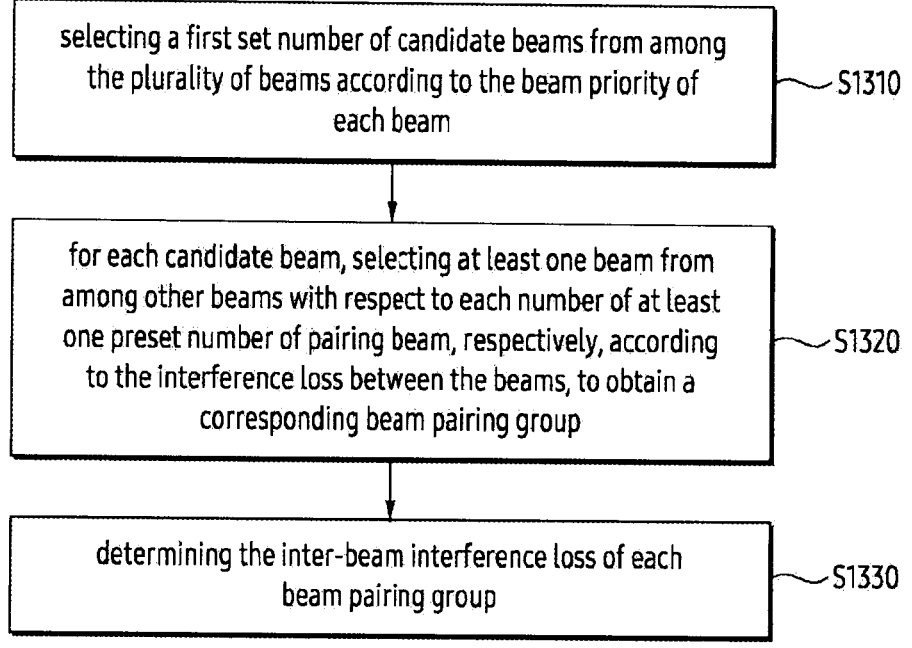

| selecting a first set number of candidate beams from among the plurality of beams according to the beam priority of each beam | S1310 |

| for each candidate beam, selecting at least one beam from among other beams with respect to each number of at least one preset number of pairing beam, respectively, according to the interference loss between the beams, to obtain a corresponding beam pairing group | S1320 |

| determining the inter-beam interference loss of each beam pairing group | S1330 |

FIG. 13A

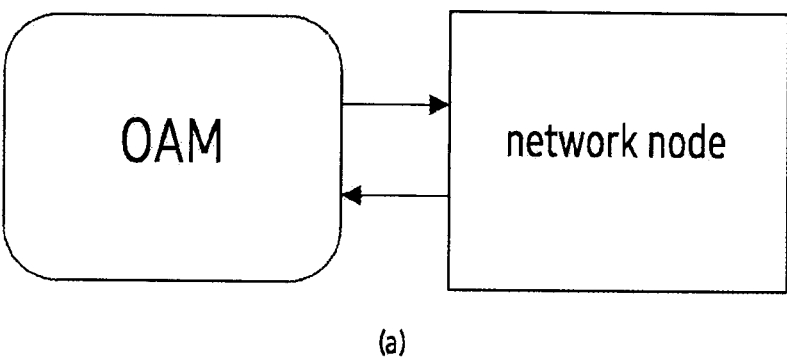
(a)
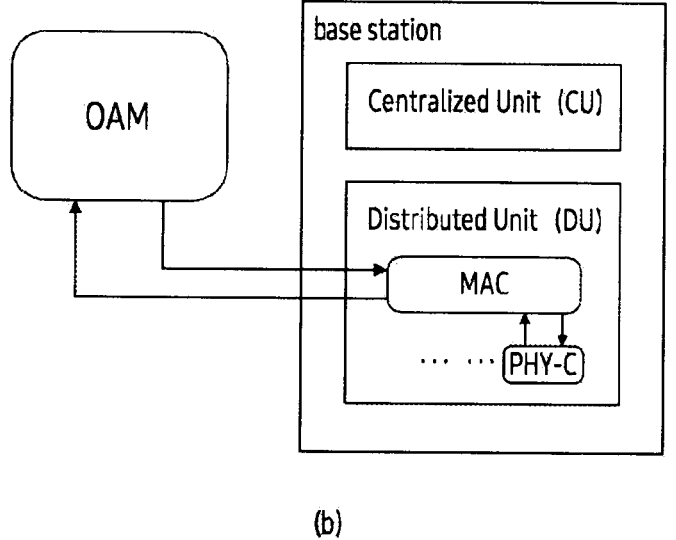
(b)
FIG. 14A

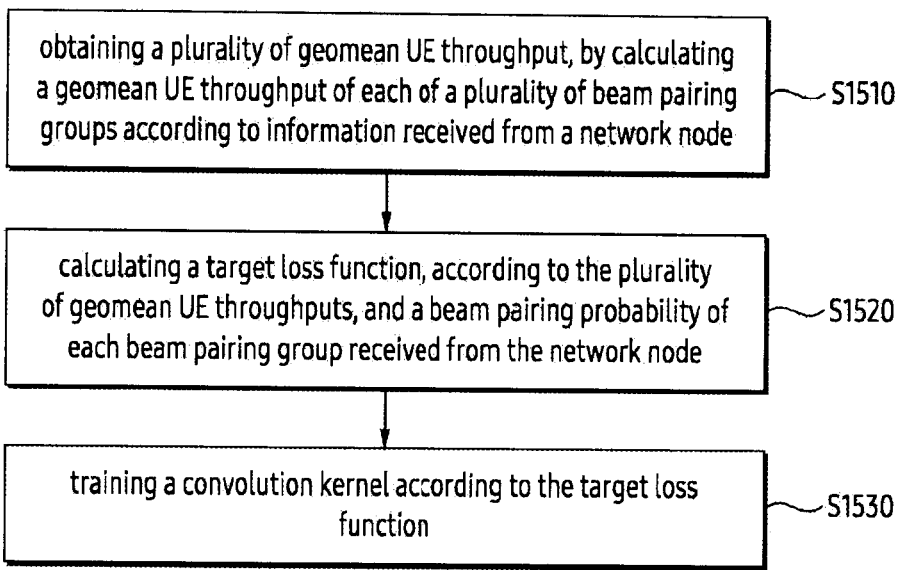

obtaining a plurality of geomean UE throughput, by calculating a geomean UE throughput of each of a plurality of beam pairing groups according to information received from a network node — S1510 calculating a target loss function, according to the plurality of geomean UE throughputs, and a beam pairing probability of each beam pairing group received from the network node — S1520 training a convolution kernel according to the target loss function — S1530

FIG. 15A

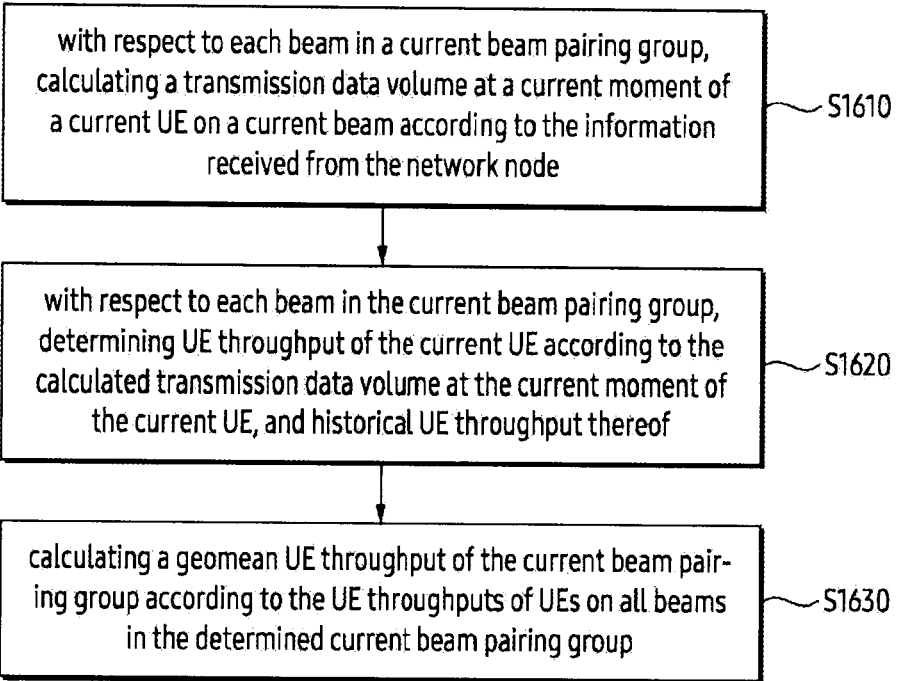

with respect to each beam in a current beam pairing group, calculating a transmission data volume at a current moment of a current UE on a current beam according to the information received from the network node — S1610 with respect to each beam in the current beam pairing group, determining UE throughput of the current UE according to the calculated transmission data volume at the current moment of the current UE, and historical UE throughput thereof — S1620 calculating a geomean UE throughput of the current beam pairing group according to the UE throughputs of UEs on all beams in the determined current beam pairing group — S1630

FIG. 16

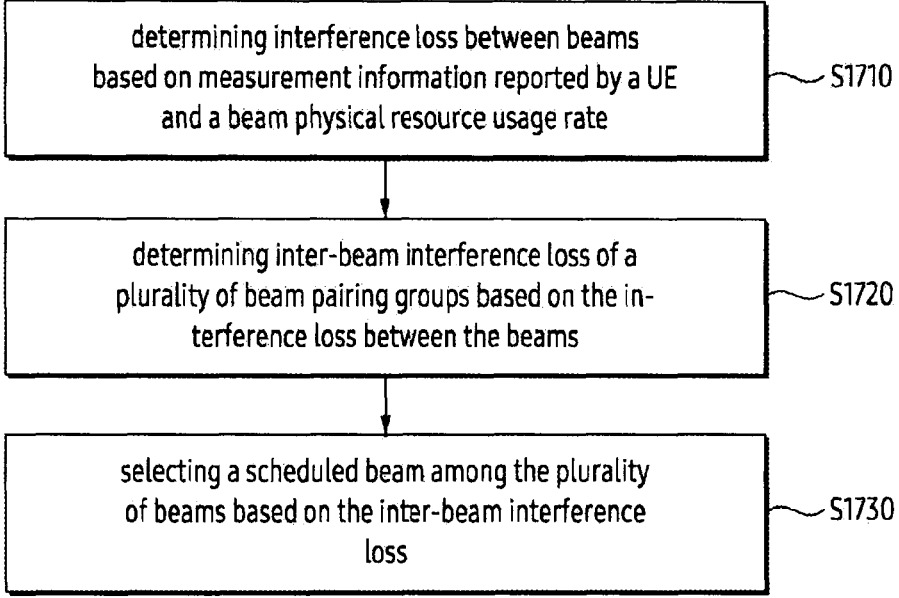

determining interference loss between beams
based on measurement information reported by a UE
and a beam physical resource usage rate    S1710 determining inter-beam interference loss of a
plurality of beam pairing groups based on the in-
terference loss between the beams    S1720 selecting a scheduled beam among the plurality
of beams based on the inter-beam interference
loss    S1730

FIG. 17

BEAM PAIRING BASED ON PRIORITY AND INTERFERENCE

CROSS-REFERENCE TO RELATED APPLICATIONS

This application is a continuation of International Application No. PCT/KR2023/005713 designating the United States, filed on Apr. 26, 2023, in the Korean Intellectual Property Receiving Office and claiming priority to Chinese Patent Application No. 202211105528.6 filed on Sep. 9, 2022, in the Chinese Patent Office, the disclosures of which are incorporated by reference herein in their entireties.

BACKGROUND

Field

The disclosure relates to the field of wireless communication. For example, the disclosure relates to a method performed by a network node and a network node.

Description of Related Art

A mmWave is a key technology in 5G, which may provide high-speed data transmission through an ultra-large bandwidth. Selecting a scheduled beam has an important impact on throughput of an mmWave system.

Those skilled in the art have been trying to study a technical problem of how to better optimize an existing method of determining a scheduled beam to better meet communication requirements.

The above information is presented as background information only to assist with an understanding of the disclosure. No determination has been made, and no assertion is made, as to whether any of the above might be applicable as prior art with regard to the disclosure.

SUMMARY

According to an example embodiment, a method performed by a network node is provided, the method including: acquiring user equipment (UE) distribution; determining a beam priority of each of a plurality of beams based on the UE distribution; and selecting a scheduled beam among the plurality of beams based on the beam priority.

According to an example embodiment, the acquiring the UE distribution includes: determining whether to update the UE distribution; acquiring the UE distribution using measurement information reported by the UE through a fully connected network, based on determining that the UE distribution needs to be updated.

According to an example embodiment, the acquiring the UE distribution using the measurement information reported by the UE through the fully connected network includes: acquiring an average signal interference plus noise ratio (SINR) of each UE in a cell within a specified period; selecting a specified number of average SINRs from among a plurality of acquired average SINRs of a plurality of UEs; normalizing each of the specified number of average SINRs; inputting the specified number of normalized average SINRs into the fully connected network to determine a probability value; determining one of multiple UE distributions corresponding to the probability value as the UE distribution.

According to an example embodiment, the determining whether to update the UE distribution includes: determining to update the UE distribution if a specified event occurs and/or if the current time meets an updating trigger period.

According to an example embodiment, it is determined that the specified event occurs based on a change in the number of UEs in a cell meeting a first specified condition and/or based on a change of an average SINR of UEs in the cell meeting a second specified condition.

According to an example embodiment, the updating trigger period is determined by: calculating a SINR variance of all UEs in the current cell within a specified duration; selecting one of a plurality of periods as the updating trigger period according to the SINR variance.

According to an example embodiment, the determining the beam priority of each of the plurality of beams based on the UE distribution includes: selecting one convolution kernel corresponding to the UE distribution from among a plurality of convolution kernels; inputting, traffic related information about each of the plurality of beams, to the one selected convolution kernel for convolution processing, to determine the beam priority of each beam in the UE distribution.

According to an example embodiment, the traffic related information includes at least one of Signal to Interference plus Noise Ratio (SINR), average throughput, and amount of traffic to be transmitted.

According to an example embodiment, the selecting the scheduled beam among the plurality of beams based on the beam priority includes: determining interference loss between beams according to the measurement information reported by the UE and/or a beam physical resource usage rate; determining inter-beam interference losses of a plurality of beam pairing groups according to the beam priority and the interference loss between the beams; selecting the scheduled beam among the plurality of beams according to the beam priority and the inter-beam interference loss.

According to an example embodiment, the determining the interference loss between beams according to the measurement information reported by the UE and/or the beam physical resource usage rate includes: determining beam interference between beams according to the measurement information reported by the UE; compensating the beam interference between the beams according to the beam physical resource usage rate; determining the interference loss between the beams according to the compensated beam interference.

According to an example embodiment, the determining the beam interference between beams according to the measurement information reported by the UE includes: for a beam for which a inter-beam interference power is obtained by UE reporting among the plurality of beams, determining beam interference from another beam for the beam, according to the inter-beam interference power for the beam from the another beam, reported by at least one UE on the beam; for a beam for which the inter-beam interference power is not obtained by UE reporting, obtaining beam interference from another beam in the plurality of beams for the beam, by interpolation according to the beam interference and/or a signal power of a beam, wherein the signal power of the beam is determined according to a signal power of the beam reported by the at least one UE on the beam.

According to an example embodiment, the compensating the beam interference between the beams according to the beam physical resource usage rate includes operations for the each determined beam interference of: determining a compensation factor corresponding to a current beam interference according to the respective beam physical resource usage rates of a current beam and another beam corresponding to the current beam interference; compensating the current beam interference using the compensation factor.

According to an example embodiment, the respective beam physical resource usage rates of the current beam and the another beam are predicted using the respective historical beam physical resource usage rates of the current beam and the another beam.

According to an example embodiment, the determining the interference loss between the beams according to the compensated beam interference includes operations for the each compensated beam interference of: determining a single-beam data transmission rate based on using a current beam for single-beam transmission;

determining a two-beam pairing data transmission rate based on using the current beam for pairing transmission with another beam;

determining the interference loss between the beams based on the current beam being interfered by the another beam, according to the single-beam data transmission rate and the two-beam pairing data transmission rate.

According to an example embodiment, the determining the inter-beam interference losses of the plurality of beam pairing groups according to the beam priority and the interference loss between the beams includes: selecting a first set number of candidate beams from among the plurality of beams according to the beam priority; for each candidate beam, selecting at least one beam from among other beams with respect to each number of at least one preset number of pairing beam, respectively, according to the interference loss between the beams, to obtain a corresponding beam pairing group; and determining the inter-beam interference loss of each beam pairing group.

According to an example embodiment, for the each candidate beam, selecting the at least one beam from among the other beams with respect to the each number of the at least one preset number of pairing beam, respectively, according to the interference loss between the beams, to obtain the corresponding beam pairing group, includes: sorting the interference loss between the beams of a current candidate beam in a descending order; with respect to the each number of the at least one preset number of pairing beam, selecting the at least one beam from among the other beams sequentially, according to the sorted interference loss, to obtain a beam pairing group corresponding to a number of pairing beam.

According to an example embodiment, the determining the inter-beam interference loss of the each beam pairing group includes: with respect to a beam pairing group of which the number of pairing beams is 2, for each beam in the beam pairing group, selecting the interference loss of the current beam based on being interfered by another beam in the beam pairing group, from among the determined interference loss between the beams, as the inter-beam interference loss of the current beam in the beam pairing group; with respect to a beam pairing group of which the number of pairing beams is greater than 2, for each beam in the beam pairing group: determining a single-beam data transmission rate based on using the current beam for single-beam transmission, determining a beam pairing data transmission rate based on using the beam pairing group for transmission, and determining the interference loss of the current beam based on being interfered by other beams in the beam pairing group as the inter-beam interference loss of the current beam in the beam pairing group, according to the single-beam data transmission rate and the beam pairing data transmission rate.

According to an example embodiment, the selecting the scheduled beam among the plurality of beams according to the beam priority and the inter-beam interference loss includes: selecting a single-beam with the highest beam priority from among the plurality of beams according to the beam priority; determining a beam pairing priory of each beam pairing group in the plurality of beam pairing groups according to the beam priority and the inter-beam interference loss, and selecting a beam pairing group with the highest beam pairing priority from among the plurality of beam pairing groups; selecting one with the highest priority from the single-beam with the highest beam priority and the beam pairing group with the highest beam pairing priority as the scheduled beam.

According to an example embodiment, the determining the beam pairing priory of the each beam pairing group in the plurality of beam pairing groups, according to the beam priority and the inter-beam interference loss includes operations for each of the plurality of beam pairing groups of: determining compensated beam priority of each beam according to the beam priority and corresponding inter-beam interference loss of each beam in the current beam pairing group; determining beam pairing priority of the current beam pairing group according to the compensated beam priority of each beam in the current beam pairing group.

According to an example embodiment, the fully connected network is trained by: classifying the UE distribution of the current cell by a clustering algorithm, based on the obtained historical SINRs of UEs; generating a label of at least one UE distribution according to a classification result; training the fully connected network according to the generated label of the at least one UE distribution.

According to an example embodiment of the present disclosure, there is provided a method performed by a network node, including: determining interference loss between beams based on measurement information reported by a user equipment (UE) and a beam physical resource usage rate; determining inter-beam interference losses of a plurality of beam pairing groups based on the interference loss between the beams; selecting a scheduled beam from among the plurality of beams based on the inter-beam interference loss.

According to an example embodiment, the determining the inter-beam interference losses of the plurality of beam pairing groups based on the interference loss between the beams includes: obtaining beam priority of each of the plurality of beams; selecting a first set number of candidate beams from among the plurality of beams according to the beam priority; for each candidate beam, selecting at least one beam from among other beams with respect to each number of at least one preset number of pairing beam, respectively, according to the interference loss between the beams, to obtain a corresponding beam pairing group; and determining the inter-beam interference loss of each beam pairing group.

According to an example embodiment, the selecting the scheduled beam from among the plurality of beams based on the inter-beam interference loss includes: selecting a single-beam with the highest beam priority from among the plurality of beams according to the beam priority; determining beam pairing priority of each beam pairing group in the plurality of beam pairing groups according to the beam priority and the inter-beam interference loss, and selecting a beam pairing group with the highest beam pairing priority from among the plurality of beam pairing groups; selecting one with the highest priority from among the single-beam with the highest beam priority and the beam pairing group with the highest beam pairing priority as the scheduled beam.

According to an example embodiment of the present disclosure, there is provided a network node, including: a transceiver; and a processor coupled to the transceiver, configured to perform the methods described as above.

According to an example embodiment of the present disclosure, there is provided an electronic apparatus, including: at least one processor; and at least one memory for storing computer executable instructions, wherein the computer executable instructions, when being executed by the at least one processor, cause the at least one processor to execute the methods described as above.

According to an example embodiment of the present disclosure, there is provided a non-transitory computer-readable storage medium for storing instructions, wherein the instructions, when executed by at least one processor, cause the at least one processor to execute the methods described as above.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4 is a flowchart illustrating an example process of determining whether a preset event occurs according to various embodiments;

FIG. 6 is a flowchart illustrating an example process of determining UE distribution through a fully connected network according to various embodiments;

FIG. 10 is a flowchart illustrating an example process of selecting a scheduled beam among a plurality of beams according to various embodiments;

FIGS. 12A, 12B and 12C are diagrams illustrating example beam interference space, and inter-beam interference loss of a beam pairing group when the number of pairing beams is 2 according to various embodiments;

FIG. 13A is a flowchart illustrating an example process of determining inter-beam interference losses of a plurality of beam pairing groups according to a beam priority of each beam and interference loss between beams according to various embodiments;

FIG. 14A is a diagram illustrating an example of deployment between a network node, to which the method according to the present disclosure is applied, and an OAM according to various embodiments;

FIG. 15A is flowchart illustrating an example process of training a convolution kernel according to various embodiments;

FIG. 16 is a flowchart illustrating an example process of calculating geomean UE throughput of a beam pairing group according to various embodiments;

FIG. 17 is a flowchart illustrating an example method performed by a network node according to various embodiments;

The same reference numerals are used to represent the same elements throughout the drawings.

DETAILED DESCRIPTION

Figure 1:
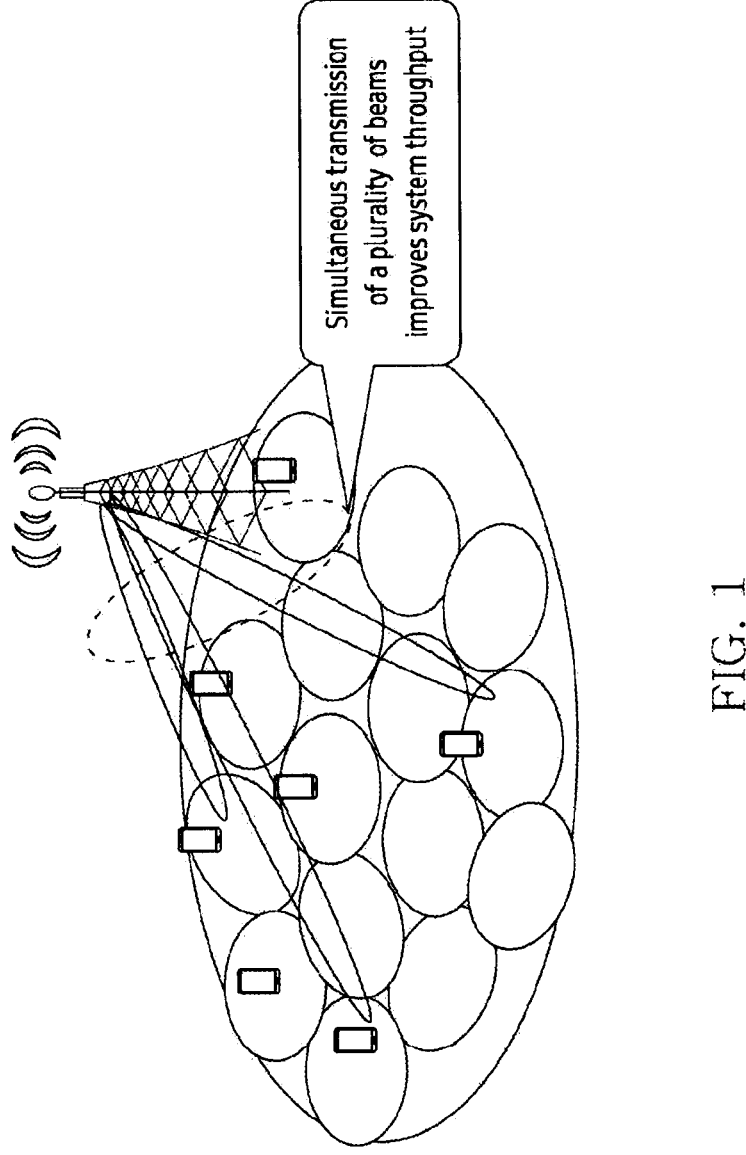
FIG. 1 is a diagram illustrating an example of beam pairing in an mmWave cell according to various embodiments.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not be limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various examples of the disclosure described below, a hardware approach will be described as an example. However, since various embodiments of the disclosure may include a technology that utilizes both the hardware-based and the software-based approaches, they are not intended to exclude the software-based approach.

As used herein, the terms referring to merging (e.g., merging, grouping, combination, aggregation, joint, integration, unifying), the terms referring to signals (e.g., packet, message, signal, information, signaling), the terms referring to resources (e.g. section, symbol, slot, subframe, radio frame, subcarrier, resource element (RE), resource block (RB), bandwidth part (BWP), opportunity), the terms used to refer to any operation state (e.g., step, operation, procedure), the terms referring to data (e.g. packet, message, user stream, information, bit, symbol, codeword), the terms referring to a channel, the terms referring to a network entity (e.g., distributed unit (DU), radio unit (RU), central unit (CU), control plane (CU-CP), user plane (CU-UP), O-DU-open radio access network (O-RAN) DU), O-RU (O-RAN RU), O-CU (O-RAN CU), O-CU-UP (O-RAN CU-CP), O-CU-CP (O-RAN CU-CP)), the terms referring to the components of an apparatus or device, or the like are only illustrated for convenience of description in the disclosure. Therefore, the disclosure is not limited to those terms described below, and other terms having the same or equivalent technical meaning may be used therefor. Further, as used herein, the terms, such as '~module', '~unit', '~part', '~body', or the like may refer to at least one shape of structure or a unit for processing a certain function.

Further, throughout the disclosure, an expression, such as e.g., 'above' or 'below' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with an expression, such as 'above', a condition described as 'less than or equal to' may be replaced with an expression, such as 'below', and a condition described as 'more than or equal to and below' may be replaced with 'above and less than or equal to', respectively. Furthermore, hereinafter, 'A' to 'B' means at least one of the elements from A (including A) to B (including B). Hereinafter, 'C' and/or 'D' means including at least one of 'C' or 'D', that is, {'C', 'D', or 'C' and 'D'}.

The disclosure describes various embodiments using terms used in some communication standards (e.g., 3rd Generation Partnership Project (3GPP), extensible radio access network (xRAN), open-radio access network (O-RAN) or the like), but it is only of an example for explanation, and the various embodiments of the disclosure may be easily modified even in other communication systems and applied thereto.

Various example embodiments of the disclosure are described below in conjunction with the accompanying drawings. It should be understood that the example embodiments described below in combination with the accompanying drawings are merely examples for explaining the the embodiments, and are not restrictions on the disclosure.

It may be understood by those skilled in the art that the singular forms "a", "an", "the" and "this" used herein may also include a plural form unless specifically stated. It should be further understood that the terms "include" and "comprise" used in the embodiments of the present disclosure may refer, for example, to a corresponding feature being implemented as the presented feature, information, data, step, operation, element, and/or component, but do not exclude implement of other features, information, data, steps, operations, elements, components and/or a combination thereof. It should be understood that when one element is "connected" or "coupled" to another element, this element may be directly connected or coupled to the another element, or it may refer, for example, to a connection relationship between this element and the another element being established through an intermediate element. In addition, "connection" or "coupling" used herein may include a wireless connection or wireless coupling. The term "and/or" used herein indicates at least one of items, for example, "A and/or B" may be implemented as "A", or "B", or "A and B". When describing a plurality of (two or more) items, if a relationship between the plurality of items is not clearly defined, between the plurality of items may refer to one, more or all of the plurality of items. For example, for a description of "a parameter A includes A1, A2, A3", it may be that the parameter A includes A1, or A2, or A3, and it may also be that the parameter A includes at least two of the three parameters A1, A2, A3.

Beam pairing has an important impact on throughput of an mmWave system. The beam pairing may improve the throughput of system by scheduling a plurality of beams in the same time-frequency resource as shown, for example, in FIG. 1.

In an mmWave base station, a proportional fairness coefficient for determining a priority of beam scheduling is fixed. This coefficient is applicable to a scenario in which user equipments (UEs) are uniformly distributed. However, in an actual cell deployment, UE distribution scenarios are diverse and non-uniform. For example, for a scenario in which most UEs are distributed in a center of a cell, if the number of times of scheduling of UEs in the center of the cell is increased, an average cell throughput may be improved. For a scenario in which most UEs are distributed at an edge of the cell, if the number of times of scheduling of UEs in the edge of the cell is increased, performance of the UEs in the edge of the cell may be ensured. Therefore, in the beam scheduling, a fixed proportional fairness coefficient cannot ensure user experience of a UE in a non-uniformly distributed scenario.

In addition, inter-beam interference and a cell environment have an important impact on performance of the beam pairing. When selecting pairing beams, predefined (e.g., specified) inter-beam interference cannot adapt to real-time changes in the cell environment and user distribution. The predefined inter-beam interference is obtained according to measured values, according to, for example, a location of the base station, the cell environment, an antenna deployment configuration, etc. Once the cell is deployed, parameters of this inter-beam interference will not be updated according to changes in the location of the base station, the cell environment and the antenna deployment configuration. In addition, the inter-beam interference is also related to amount of traffic in a current beam. For example, if the amount of traffic in an adjacent beam is large, it will cause relatively large interference to the current beam; if the amount of traffic in the adjacent beam is small, the interference to the current beam is relatively small Therefore, if the predefined inter-beam interference does not match information of the current cell environment, the amount of traffic and so on, it will lead to selection of high interference beams for pairing when beam pairing is performed, resulting in a reduction in throughput.

In addition, when beam pairing is performed, the overall optimal performance cannot be ensured based on a principle of one-step optimization. That is, based on the principle of one-step optimization, a first beam may be selected firstly, and then a second beam paired with the first beam may be selected, but this cannot ensure that the selected beam pairing group including the first beam and the second beam is the optimal among all beam pairing groups.

Figure 2:
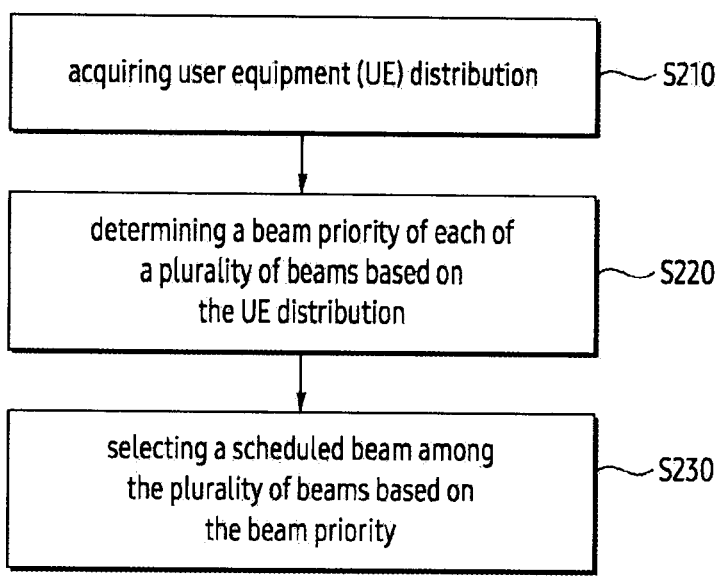
FIG. 2 is a flowchart illustrating an example method performed by a network node according to an various embodiments.

FIG. 2 is a flowchart illustrating an example method performed by a network node according to various embodiments. The network node may be a next Generation NodeB (gNB, also known as a base station, data unit, etc.), an Open Radio Access Network (ORAN) RAN Intelligent Controller (RIC) entity or other entities in which other network sides determine a scheduled beam, but the disclosure is not limited to this, the network node may also be a network server, which may receive various information from a gNB, ORAN RIC entity, etc, and select the scheduled beam from among the plurality of beams according to the received information. In the network node, different functions may be completed by a plurality of sub entities respectively, and a connection between sub entities may be a wired connection or a wireless connection, which is not specifically limited in the present disclosure.

As shown in FIG. 2, in step S210, user equipment (UE) distribution is acquired.

For example, in an actual cell deployment, distribution of UEs may be diverse and non-uniform, that is, there may be a variety of UE distribution scenarios, each of which may be represented by UE distribution, UE distribution type, UE distribution index or UE distribution identification information, that is, in the present disclosure, the UE distribution, the UE distribution type, the UE distribution index and the UE distribution identification information may have the same meaning and may be used to indicate the UE distribution scenario, which may be used interchangeably. For example, a variety of UE distribution scenarios may include a scenario in which UEs are uniformly distributed, a scenario in which most UE are distributed in a center of a cell, a scenario in which most UE are distributed in the middle of the cell, a scenario in which most UE are distributed at an edge of the cell, and so on, and the UE distribution may change as time goes on. In other words, acquiring the UE distribution in step S210 may also be understood as acquiring the identification information, index or type used to represent the UE distribution. Therefore, when acquiring the UE distribution, first, it is necessary to determine whether to update the UE distribution. In other words, it is necessary to check whether the previously determined UE distribution still corresponds to the current actual UE distribution scenario.

In an example embodiment of the present disclosure, if a preset event occurs, it is determined that the UE distribution needs to be updated, that is, when a preset event occurs, the update operation of the UE distribution is triggered, for example, when an emergency (such as fire and earthquake) occurs, the update operation of the UE distribution is triggered. This will be described in greater detail below with reference to FIGS. 3 and 4.

Figure 3:
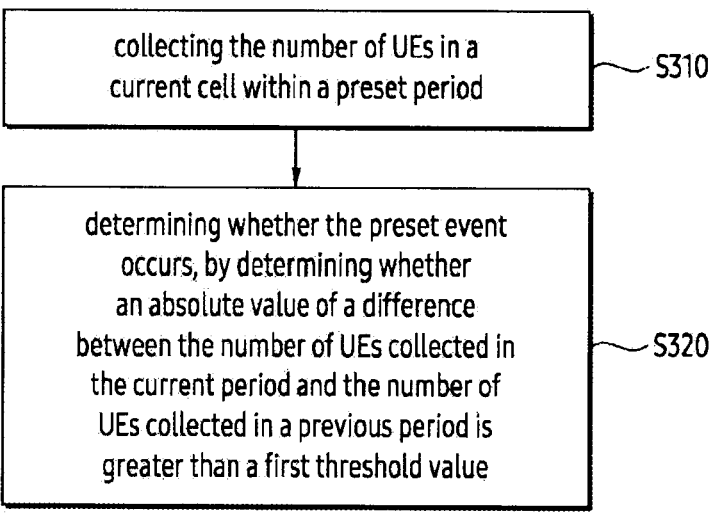
FIG. 3 is a flowchart illustrating an example process of determining whether a preset event occurs according to various embodiments.

In an example, according to a preset period (e.g., 5 minutes, 6 minutes, etc.), whether the preset event occurs may be determined according to a change in the number of UEs in a cell. It may be determined that the preset event occurs when the change in the number of UEs in the cell meets a first preset condition. For example, as shown in FIG. 3, in step S310, the number of UEs in a current cell within a preset period (e.g., 5 minutes) is collected. In step S320, whether the preset event occurs is determined by determining whether an absolute value of a difference between the number of UEs collected in the current period and the number of UEs collected in a previous period is greater than a first threshold value, wherein the first threshold value is a value related to the number of UEs collected in the previous period, for example, it may be 30% of the number of UEs collected in the previous period. If the above absolute value is greater than the first threshold value, it indicates that the change in the number of UEs in the current cell in two periods before and after is large, therefore, it is determined that the preset event occurs, otherwise, it is determined that the preset event does not occur.

Figure 5A:
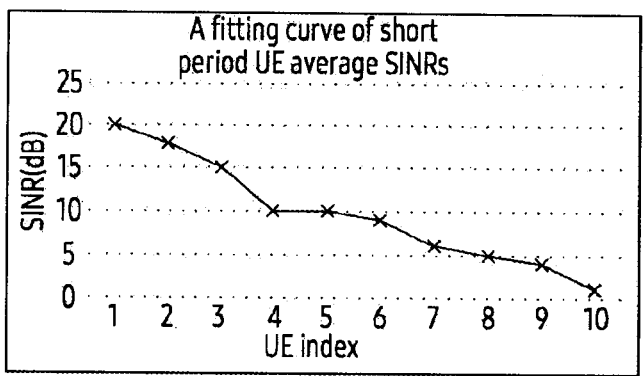
FIGS. 5A, 5B and 5C are graphs illustrating fitting curves of average SINRs according to an various embodiments.
Figure 5B:
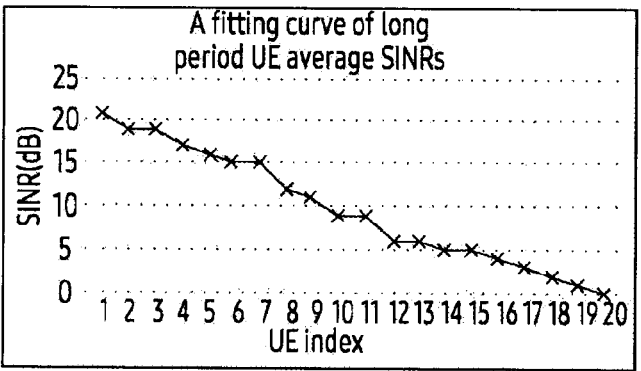
Figure 5C:
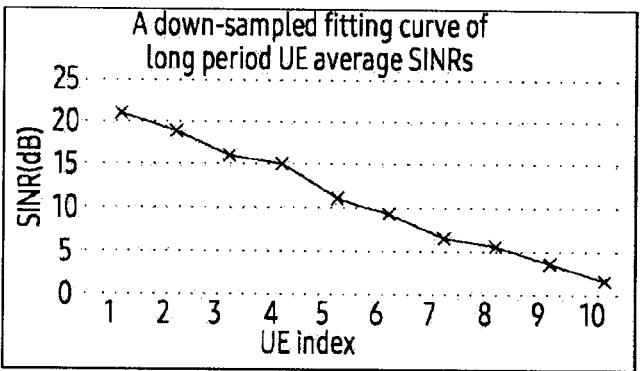

In another example, compared with a Reference Signal Receiving Power (RSRP) and a Timing Advance (TA) which may only represent a distance between a base station and a UE, a SINR is able to simultaneously represent the distance and interference between the base station and the UE, therefore, the SINR is more accurate information that represents a UE distribution scenario, and may be easily obtained from UE reporting. Therefore, the present disclosure may also use the SINR to determine whether the preset event occurs, and then determine whether to update the UE distribution. For example, according to the preset period, whether the preset event occurs may be determined according to a change in an average SINR of the UEs in the current cell. When the change in the average SINR of the UEs in the current cell meets a second preset condition, it is determined that the preset event occurs. For example, as shown in FIG. 4, in step S410, an average SINR of each UE in the current cell within the first set period (e.g., a short period, e.g., 5 minutes) is collected, and a fitting curve of short period UE average SINR $y_S$ is determined according to the collected average SINR of each UE within the first set period, as shown, for example, in of FIG. 5A. In step S420, an average SINR of each UE in the current cell within a second set period (e.g., a long period, e.g., 30 minutes) is collected, and a fitting curve of long period UE average SINR $y_L$ is determined according to the collected average SINR of each UE within the second set period, as shown in FIG. 5B, wherein, due to a movement of the UEs (e.g., a UE which is not in the current cell previously enters the current cell), the number of UEs of which the SINRs are collected in the current cell within the second set period may be different from (e.g., more than) the number of UEs of which the SINRs are collected in the current cell in the first set period; then, in step S430, the down-sampled fitting curve of the long period UE average SINRs $y'_L$, of which the number of UEs is same as that of the fitting curve of the short period UE average SINRs, is obtained by down sampling the fitting curve of the long period UE average SINRs, as shown in FIG. 5C. In step S440, a correlation between the fitting curve of the short period UE average SINRs $y_S$ and the down-sampled fitting curve of the long period UE average SINRs $y'_L$ is calculated. In step S450, whether the preset event occurs is determined by determining whether the above correlation is less than a second threshold value (e.g., 40%), wherein the second threshold value is configurable. If the above correlation is less than the second threshold value, it indicates that the change in the average SINR of UEs in the current cell is large, so it is determined that the preset event occurs, otherwise, it is determined that the preset event does not occur.

In an example embodiment of the present disclosure, in addition to determining to update UE distribution when a preset event occurs, it is also determined that the UE distribution needs to be updated if current time meets an updating trigger period. That is, an update operation of the UE distribution may be triggered according to the updating trigger period, which is configurable. For example, the updating trigger period may be determined according to a change speed of SINRs of UEs in a current cell. Specifically, first, a SINR variance of all UEs in the current cell within a preset duration may be calculated, then, one of a plurality of periods is selected as the updating trigger period according to the SINR variance, for example, by comparing the SINR variance with at least one predetermined threshold, and selecting one of the plurality of periods as the updating trigger period according to a comparison result. For example, assuming that the plurality of periods are a short period of 30 minutes and a long period of 60 minutes. If the SINR variance is less than a first predetermined threshold (e.g., 2), it indicates that the SINRs of the UEs in the current cell change slowly, the long period of 60 minutes is selected as the updating trigger period, accordingly, if the SINR variance is greater than or equal to the first predetermined threshold, it indicates that the SINRs of the UEs in the current cell changes rapidly, and the short period of 30 minutes is selected as the updating trigger period, accordingly, but this is only an example. For example, the SINR variance may be compared with the first predetermined threshold and a second predetermined threshold (the first predetermined threshold is less than the second predetermined threshold), and the plurality of periods are a first period, a second period and a third period (the first period<the second period<the third period). If the SINR variance is less than the first predetermined threshold, the third period is selected as the updating trigger period, if the SINR variance is less than the second predetermined threshold and greater than or equal to the first predetermined threshold, the second period is selected as the updating trigger period, if the SINR is greater than or equal to the third predetermined threshold, the shortest first period is selected as the updating trigger period.

The process of determining whether to update the UE distribution is described as above. The present disclosure may use the preset event to trigger the update of the UE distribution, or triggers the update of the UE distribution according to the certain period, which may ensure performance and reduce complexity at the same time, and may make the UE distribution more accurately represent a real distribution scenario of current UEs, and provide support on a subsequent determination of a beam priority according to the UE distribution. In various embodiments of the present disclosure, if it is determined that the UE distribution needs to be updated, the UE distribution is obtained using measurement information reported by the UE, through a fully connected network, wherein the measurement information reported by the UE may be, for example, SINR. This will be described in greater detail below with reference to FIG. 6.

FIG. 6 is a flowchart illustrating an example process of obtaining UE distribution through a fully connected network according to various embodiments.

As shown in FIG. 6, in step S610, an average SINR of each UE in a cell within a predetermined period is acquired, wherein the predetermined period is configurable, for example, it may be 30 minutes, 50 minutes, etc. For example, assuming that the predetermined period is 30 minutes, the cell has 7 UEs in total, and the 7 collected average SINRs of the 7 UEs are S1, S2, S3 . . . S7, respectively.

Figure 7A:
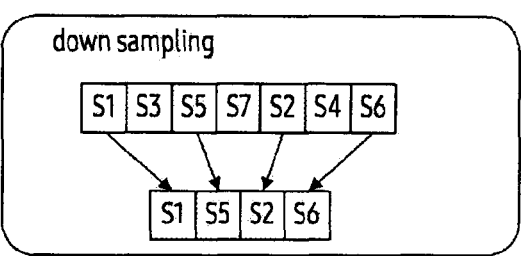
FIGS. 7A and 7B are diagrams illustrating an example process of determining a predetermined number of average SINRs by a sampling method according to various embodiments.
Figure 7B:
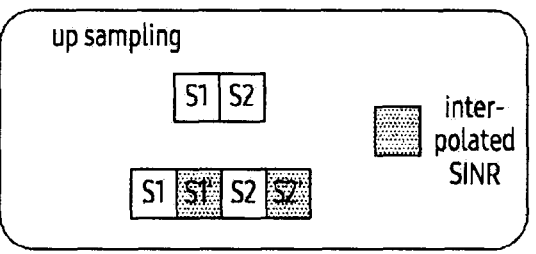

In step S620, a predetermined number of average SINRs are selected from among a plurality of acquired average SINRs of a plurality of UEs. For example, first, the plurality of acquired average SINRs of the plurality of UEs are sorted according to an order of average SINRs from large to small. For example, an order of the above collected 7 average SINRs sorted according to the order of average SINRs from large to small is S1, S3, S5, S7, S2, S4, S6. If the number of the sorted average SINRs is greater than a predetermined number, the predetermined number of average SINRs may be determined by down sampling the sorted average SINRs, as shown in FIG. 7A, for example, assuming that the predetermined number is 4, S1, S5, S2 and S6 are obtained by down sampling the sorted S1, S3, S5, S7, S2, S4, S6. In addition, if the number of the sorted average SINRs is less than the predetermined number, the predetermined number of average SINRs may be determined by up sampling the sorted average SINRs, as shown in FIG. 7B, wherein the up sampling method may adopt linear interpolation. For example, assuming that the predetermined number is 4, the plurality of sorted average SINRs only include two SINRs, such as S1 and S2, the two average SINR values S1' and S2' may be obtained by performing the linear interpolation of S1 and S2, and four average SINRs of S1, S1', S2 and S2' are finally determined. If the number of the plurality of sorted average SINRs is equal to the predetermined number, the sorted average SINRs are determined as the predetermined number of average SINRs.

In step S630, each of the predetermined number of average SINRs is normalized. Specifically, each of the predetermined number of average SINRs may be normalized to a value between 0 and 1.

In step S640, the predetermined number of normalized average SINRs are input to a fully connected network to determine a probability value.

In step S650, one of multiple UE distributions corresponding to the probability value is determined as the UE distribution.

Figure 8:
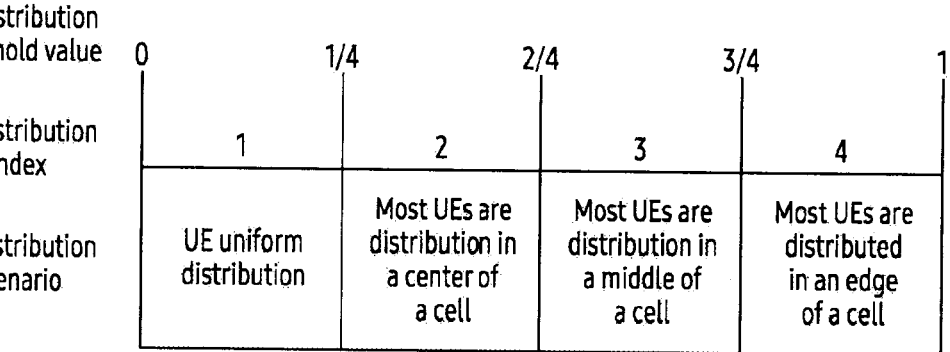
FIG. 8 is a diagram illustrating an example of correspondence among UE distribution indexes, UE distribution threshold values and various UE distribution scenarios according to various embodiments.

For example, corresponding UE distribution threshold values are determined according to respective UE distribution index (or UE distribution) and a total number of the UE distribution. As described above, each UE distribution index represents a UE distribution scenario, assuming that there are four UE distribution scenarios, of which the UE distribution indexes are index 1 (representing a scenario of UE uniform distribution), index 2 (representing that most UEs are distributed in a center of the cell), index 3 (representing that most UEs are distributed in a middle of the cell), and index 4 (representing that most UEs are distributed in an edge of the cell), respectively, the UE distribution threshold values=UE distribution indexes/the total number of UE distribution. Therefore, there are four UE distribution threshold values: ¼, 2/4, ¾, and 1. FIG. 8 is a diagram illustrating an example of correspondence among UE distribution indexes (e.g., UE distribution), UE distribution threshold values and various UE distribution scenarios. This correspondence may be pre-generated by a network node according to the multiple UE distribution scenarios, or generated in real time each time the UE distribution scenario is determined, which is not specifically limited in the present disclosure.

The UE distribution is determined according to the UE distribution threshold values and the probability value obtained through the fully connected network. For example, if the probability value obtained through the fully connected network is greater than 0 and less than or equal to ¼, then it is determined that the UE distribution index 1 is the UE distribution corresponding to this probability value (that is, representing that the UE distribution scenario with UE uniform distribution). If the probability value obtained through the fully connected network is greater than ¼ and less than or equal to ²⁄₄, then it is determined that UE distribution index 2 is the UE distribution corresponding to this probability value (that is, representing that the UE distribution scenario in which the most UEs are distributed in the center of the cell). If the probability value obtained through the fully connected network is greater than ²⁄₄ and less than or equal to ¾, then it is determined that UE distribution index 3 is the UE distribution corresponding to this probability value (that is, representing that the UE distribution scenario in which the most UEs are distributed in the middle of the cell). If the probability value obtained through the fully connected network is greater than ¾ and less than or equal to 1, it is determined that the UE distribution index 4 is the UE distribution 4 corresponding to this probability value (that is, representing that the UE distribution scenario in which the most UEs are distributed at the edge of the cell).

Embodiments of the disclosure may determine, using the fully connected network, real-time UE distribution, or real-time UE distribution scenario. Compared with a traditional non-AI solution, this fully connected network may sense changes in UE distribution scenario. The process of determining UE distribution is described above.

Referring back to FIG. 2, in step S220, a beam priority of each of a plurality of beams is determined based on the UE distribution. This will be described in greater detail below with reference to FIG. 9.

Figure 9:
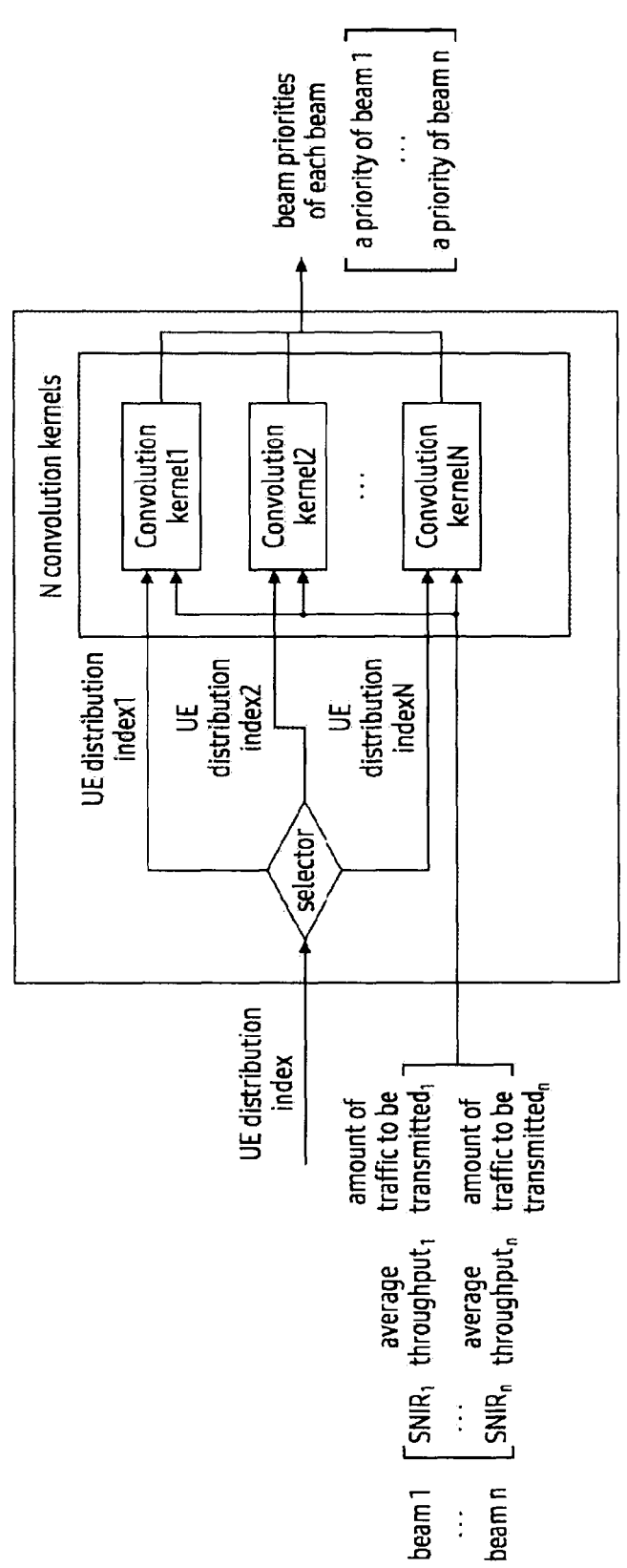
FIG. 9 is a diagram illustrating an example process of generating a beam priority according to various embodiments.

FIG. 9 is a diagram illustrating an example of generating a beam priority according to various embodiments.

One convolution kernel corresponding to UE distribution is selected from among a plurality of convolution kernels. In an example embodiment of the present disclosure, the number of convolution kernels may be the same as the total number of the UE distribution, that is, there are as many convolution kernels as there are kinds of UE distribution, and each convolution kernel corresponds to a kind of UE distribution (e.g., UE distribution index). For example, a convolution kernel 1 corresponds to a UE distribution index 1, a convolution kernel 2 corresponds to a UE distribution index 2, and a convolution kernel 3 corresponds to a UE distribution index 3, a convolution kernel N corresponds to a UE distribution index N. Therefore, after the UE distribution is determined, a convolution kernel corresponding thereto may be selected from among the plurality of convolution kernels according to the UE distribution.

Traffic related information about each of the plurality of beams is input to the one selected convolution kernel for convolution processing, to determine the beam priority of each beam in the UE distribution, wherein the traffic related information includes at least one of Signal to Interference plus Noise Ratio (SINR), average throughput and amount of traffic to be transmitted, the SINR contains data transmission rate information at a current moment, the average throughput contains data transmission rate information at a past moment, the amount of traffic to be transmitted is used to determine small data packets, which are transmitted firstly, to reduce delay. As shown in FIG. 9, assuming that there are n beams, a network node determines SINRs, average throughputs and amounts of traffic to be transmitted of each beam according to information received directly or indirectly from UEs. For example, for each beam, the network node may directly or indirectly receive at least one of the SINR, average throughput and amount of traffic to be transmitted from a UE with the highest priority on a current beam, and take the received at least one of the SINR, average throughput and amount of traffic to be transmitted, as the traffic related information about the current beam. The traffic related information about each of the n beams may be determined according to this method, and they are input into the one selected convolution kernel corresponding to the UE distribution. In addition, the present disclosure is not limited to this, other methods may be used to determine the traffic related information about the current beam. For each beam, this convolution kernel obtains the beam priority of the current beam by convoluting at least one of the input SINR, average throughput and amount of traffic to be transmitted for the current beam in a one-dimensional space dimension, and obtains the beam priority of the n beams shown in FIG. 9. In the above process, the priority of each beam is determined according to the UE distribution determined in real time, and thus a more accurate beam priority may be obtained.

Referring back to FIG. 2, in step S230, a scheduled beam is selected from among the plurality of beams based on the beam priority of each beam. This will be described in greater detail below with reference to FIG. 10.

FIG. 10 is a flowchart illustrating an example process of selecting a scheduled beam among a plurality of beams according to various embodiments.

Figure 11A:
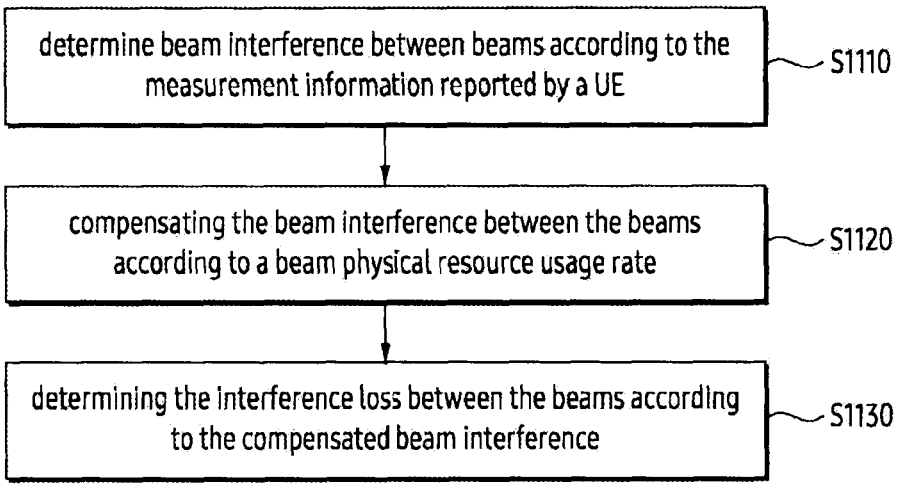
FIG. 11A is a flowchart illustrating an example process of determining interference loss between beams according to measurement information reported by a UE and/or a beam physical resource usage rate, according to various embodiments.
Figure 11B:
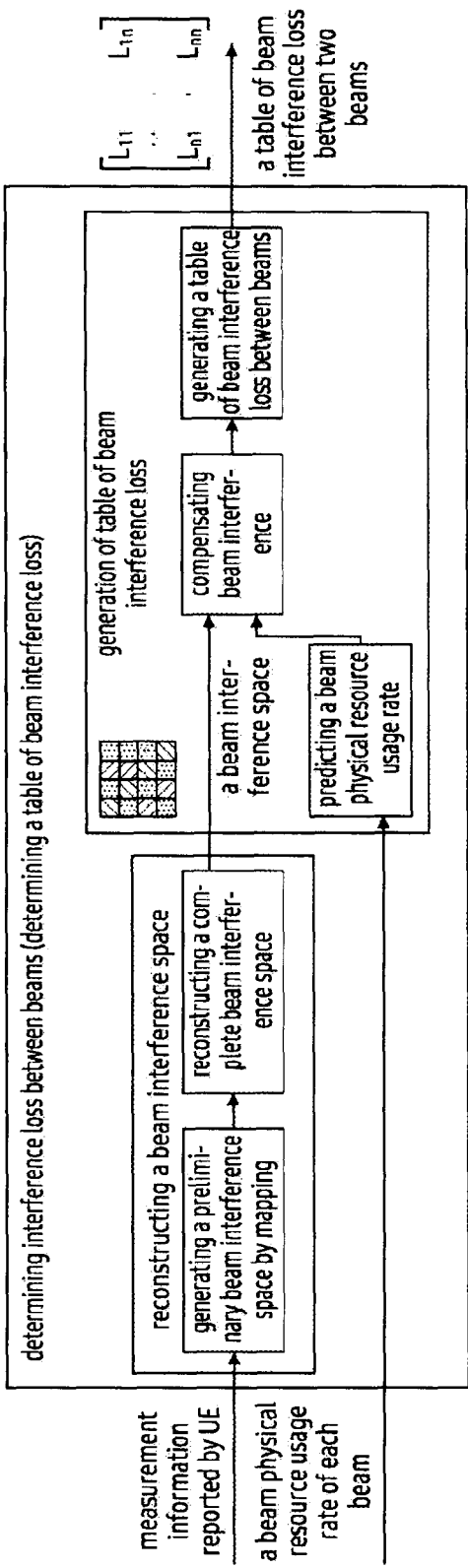
FIG. 11B is a diagram illustrating an example process of determining interference loss between beams according to various embodiments.

As shown in FIG. 10, in step S1010, interference loss between beams is determined according to the measurement information reported by a UE and/or a beam physical resource usage rate. Step S1010 is described in greater detail below with reference to FIG. 11A and FIG. 11B. FIG. 11A is a flowchart illustrating an example process of determining interference loss between beams according to measurement information reported by a UE and/or a beam physical resource usage rate, according to various embodiments. FIG. 11B is a diagram illustrating an example process of determining interference loss between beams according to various embodiments. In the present disclosure, the interference loss between beams may also be referred to as the beam interference loss table.

As shown in FIG. 11A, in step S1110, beam interference between beams is determined according to the measurement information reported by the UE.

In an example embodiment of the present disclosure, for ease of description, a term of beam interference space is introduced here. The beam interference space may include a plurality of beam interferences between beams and signal powers of a plurality of beams, wherein, the beam interference represents a inter-beam interference power received by a current beam from another beam in the current cell, which may be, for example, RSRP, it may also be a signal power when traffic data is transmitted, which is not specifically limited in the present disclosure. Considering a signaling overhead, the UE only reports the inter-beam interference power for partial beams, and the inter-beam interference powers for other beams cannot be directly obtained by UE reporting. In addition, for signal powers in the beam interference space, the UE reports the signal power of each beam. Therefore, the inter-beam interference through the following methods is determined. For example, step S1110 is used to perform the process of reconstructing the beam interference space as shown in FIG. 11B.

For a beam for which a inter-beam interference power is obtained by UE reporting among a plurality of beams, a beam interference from another beam for the beam is determined according to a inter-beam interference power for the beam from the another beam, reported by at least one UE on the beam. For example, the inter-beam interference power for the beam from the another beam reported by at least one UE on the beam actually represents a signal power of the another beam received by the at least one UE on the beam. For a current beam, if a network node may obtain, from at least one UE on the current beam, the inter-beam interference power received by the current beam from another beam, the network node maps the inter-beam interference power reported by the at least one UE, to the beam interference of the another beam for the current beam.

For example, a beam interference $F_{i,j}$ from a j-th beam in the current cell for the current beam i may be calculated by the following equation:

$$F_{i,j} = \left(\sum_{k=1}^{K} P_{k,i,j}\right)/K \qquad (1)$$

Wherein, K represents the number of UEs on the current beam i, and $P_{k,i,j}$ represents a inter-beam interference power received by the current beam i from the j-th beam, reported by the k-th UE on the current beam i. For example, there are three UEs (UE1, UE2 and UE3) in total on the current beam i, inter-beam interference powers received by the current beam i from the j-th beam reported by them are $P_{1,i,j}$, $P_{2,i,j}$ and $P_{3,i,j}$, respectively (that is, signal powers of the j-th beam received by the three UEs on the current beam i). Therefore, the beam interference of the j-th beam for the current beam i is: $F_{i,j}=(P_{1,i,j}+P_{2,i,j}+P_{3,i,j})/3$.

In addition, for each of the plurality of beams, the signal power of the beam is determined according to the signal power of the beam reported by the at least one UE on the beam. For example, for the current beam, if the network node may directly or indirectly obtain the signal power of the current beam from the at least one UE on the current beam, for example, the signal power of the current beam may be RSRP, or it may be the signal power when traffic data is transmitted, this disclosure is not limited, then the network node maps the signal power of the current beam reported by the at least one UE on the current beam, to the signal power of the current beam. At this time, the signal power of the current beam may also be understood as the inter-beam interference power from the current beam for the current beam. Therefore, the signal power of the current signal may still be calculated according to the above equation (1), that is, in the above equation (1), i=j, $F_{i,j}$ represents a signal power of the current beam i, $P_{k,i,j}$ represents a signal power on the current beam i reported by the k-th UE on the current beam i. For example, assuming that there are three UEs (UE1, UE2 and UE3) in total on the current beam i, and the signal power on the current beam i reported by them are $P_{1,i,j}$, $P_{2,i,j}$ and $P_{3,i,j}$, respectively. Therefore, the signal power of the current beam i is: $F_{i,j}=(P_{1,i,j}+P_{2,i,j}+P_{3,i,j})/3$.

The signal power of some beams and the beam interferences between a part of the beams have been determined according to the measurement information reported by the UE, that is, as shown in FIG. 11B, a preliminary beam interference space is generated by mapping.

Figure 12A:
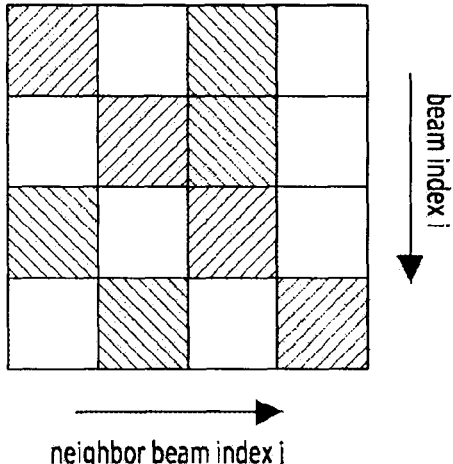

In addition, for a beam for which the inter-beam interference power is not obtained by UE reporting, according to the beam interference and a signal power of a beam calculated above, a beam interference from another beam in the plurality of beams for the beam is obtained by an interpolation, and then the reconstruction of the complete beam interference space shown in FIG. 11B is implemented. As mentioned above, the signal power of the beam is determined according to the signal power of the beam reported by at least one UE on the beam. In addition, the interpolation method may adopt a method of bilinear interpolation, spherical interpolation and so on. For example, as shown in FIG. 12A, for beam 2, a network node does not obtain, from any UE on beam 2, an inter-beam interference power from beam 1 for beam 2. Therefore, a beam interference $F_{2,1}$ from beam 1 for beam 2 cannot be calculated according to the above equation (1). In this case, The beam interference $F_{2,1}$ from beam 1 for beam 2 may be calculated by interpolation calculation according to a beam interference between beams and a signal power of the beam calculated by equation (1).

Figure 12B:
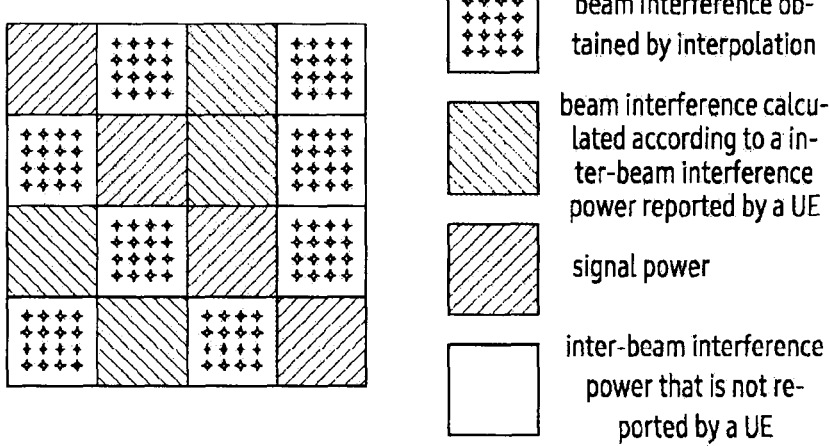

Through the above operation, a complete beam interference space as shown in FIG. 12B may be obtained. This beam interference space may include beam interferences between beams and signal powers, that is, include beam interferences calculated according to equation (1), signal powers calculated according to equation (1), and beam interferences interpolated according to at least one of both the formers.

The beam interference between beams is not only interfaced by a cell environment, but also by amount of traffic on a beam. If the amount of traffic on one beam is large, the beam interference from the bean for other beams is also large, and vice versa. The size of amount of traffic on the beam may be expressed by a beam physical resource usage rate. Accordingly, the beam interference for one beam is related to the beam physical resource usage rate on the beam and a physical resource usage rate of a beam that interferes with the beam.

Therefore, after the beam interference between beams is determined above, in step S1120, the beam interference between beams is compensated according to the beam physical resource usage rate, as shown in FIG. 11B, the complete beam interference space obtained in the previous step is compensated.

In an example embodiment of the present disclosure, the compensating the beam interference between beams according to the beam physical resource usage rate may include operations for the each determined beam interference of: determining a compensation factor corresponding to a current beam interference according to the respective beam physical resource usage rates of the current beam and another beam corresponding to the current beam interference; compensating the current beam interference using the compensation factor, wherein the current beam interference represents a beam interference from the another beam for the current beam. This is described in detail below.

It may be necessary to determine the respective beam physical resource usage rates of the current beam and the another beam corresponding to the current beam interference. As shown in FIG. 11B, their respective beam physical resource usage rates may be predicted using the respective historical beam physical resource usage rates of the current beam and the another beam. For example, for the current beam, the historical beam physical resource usage rate of the current beam may be used to predict the beam physical resource usage rate of the current beam at a next moment, wherein, a commonly used AI prediction method (such as a Long Short Term Memory (LSTM), a Support Vector Regression (SVR), etc.) may be used to perform this prediction operation. Similarly, for another beam corresponding to the current beam interference, the historical beam physical resource usage rate of the another beam may be used to predict the beam physical resource usage rate of the another beam at the next moment.

After the respective beam physical resource usage rates of the current beam and the another beam corresponding to the current beam interference are determined, they are used to determine the compensation factor corresponding to the current beam interference. For example, the determining the compensation factor corresponding to the current beam interference may include: calculating a relative ratio between the beam physical resource usage rate of the another beam and the beam physical resource usage rate of the current beam; if the relative ratio is greater than or equal to a first threshold, the compensation factor is set to a first value; if the relative ratio is less than the first threshold, the compensation factor is set to a second value, wherein the first value is greater than the second value.

For example, a relative ratio Pro between a beam physical resource usage rate $R_A$ of the another beam and a beam physical resource usage rate $R_C$ of the current beam is calculated using the following equation (2):

$$Pro = R_A/R_C \qquad (2)$$

The compensation factor to be applied to the current beam interference is set by comparing the relative ratio Pro with the first threshold. For example, if the relative ratio Pro is greater than or equal to the first threshold, it indicates that the another beam interferes with all physical resources on the current beam, at this time, the compensation factor to be applied to the current beam interference may be set to be the first value. If the relative ratio Pro is less than the first threshold, it indicates that the another beam interferes with partial physical resources on the current beam, at this time, the compensation factor to be applied to the current beam interference may be set to be the second value. Wherein, the first threshold is configurable, for example, it may be configured as 1. In addition, the first value is greater than the second value and the both are configurable, for example, the first value may be 1, and the second value may be a value related to the relative ratio Pro, for example, it may be equal to the relative ratio Pro, but this disclosure is not limited to this.

Based on the compensation factor to be applied to the current beam interference being determined, the current beam interference $F_{i,j}$ may be compensated using the compensation factor $Factor_{i,j}$ based on the following equation (3).

$$F'_{i,j} = F_{i,j} \times Factor_{i,j} \qquad (3)$$

Wherein, $F'_{i,j}$ represents a compensated current beam interference, that is, a beam interference from another beam j for the current beam i.

Similarly, according to the same method, a compensated beam interference between beams may be obtained by compensating for each beam interference in the beam interference space, so that the beam interference between beams may more accurately reflect interference from a neighbor beam for physical resources on this beam.

In step S1130, the interference loss between the beams is determined according to the compensated beam interference, as shown in FIG. 11B, a table of beam interference loss between beams is generated.

The determining the interference loss between beams according to the compensated beam interference includes operations for the each compensated beam interference of: determining a single-beam data transmission rate when using a current beam for single-beam transmission; determining a two-beam pairing data transmission rate when using the current beam for pairing transmission with another beam; determining the interference loss between the beams when the current beam is interfered by the another beam, according to the single-beam data transmission rate and the two-beam pairing data transmission rate.

For example, in the following description, the current beam interference in the compensated beam interference represents beam interference from the another beam for the current beam. A single-beam data transmission rate $Rate_i$ when a current beam i is used for single-beam transmission is determined according to a SINR when the current beam is used for the single beam transmission, based on the following equation (4):

$$Rate_i = \log2(1+SINR_i) \qquad (4)$$

Wherein, $SINR_i$ refers to the SINR of the current beam i for the single beam transmission, which may be obtained from the outside by the network node, or may be obtained from its own link adaptation module when the network node is a base station.

The two-beam pairing data transmission rate is determined, according to the signal power of the current beam, the SINR when the current beam is used for the single beam transmission, and the compensated beam interference from the another beam for the current beam.

For example, first, a pairing SINR when the current beam is paired with the another beam is calculated, according to the signal power of the current beam, the SINR when the current beam is used for the single beam transmission, and the compensated beam interference from the another beam for the current beam, using the following equation (5):

$$SINR_{i,j} = P_i/(P_i/SINR_i + F_{i,j}) \qquad (5)$$

Wherein, $SINR_{i,j}$ represents the pairing SINR when the current beam i is paired with another beam j, $P_i$ represents the signal power of the current beam, $P_i$ may be directly obtained from the beam interference space described above, $F_{i,j}$ represents the compensated beam interference from the another beam j for the current beam i, it may also be referred to as the compensated beam interference or beam pairing interference when the current beam i is paired with the another beam j.

The two-beam pairing data transmission rate $Rate_{i,j}$ when the current beam i is paired with the another beam j is calculated, using the following equation (6):

$$Rate_{i,j} = \log2(1+SINR_{i,j}) \qquad (6)$$

In addition, it should be noted that the two-beam pairing data transmission rate $Rate_{i,j}$ when the current beam i is paired with the another beam j, may be different from the two-beam pairing data transmission rate $Rate_{j,i}$ when the another beam j is paired with the current beam i.

Based on the single-beam data transmission rate $Rate_i$ and the two-beam pairing data transmission rate $Rate_{i,j}$ of the current beam, the interference loss $L_{i,j}$ between the beams when the current beam i being interfered by the another beam j may be determined according to $Rate_i$ and $Rate_{i,j}$ according to the following equation (7):

$$L_{i,j}=Rate_{i,j}/Rate_i \qquad (7)$$

It is thus possible to obtain the interference loss $L_{i,j}$ between the beams when the current beam i is interfered by the another beam j, which may also be referred to as the 2-beam pairing loss $L_{i,j}$ when the current beam i is paired with the another beam j. In addition, according to the above calculation process, the interference loss $L_{i,j}$ between the beams when the current beam i is paired with the another beam j, may be different from the interference loss $L_{j,i}$ between the beams when the another beam j is paired with the current beam i.

In a similar manner, for each compensated beam interference, the interference loss between the corresponding beams may be calculated, that is, the 2-beam pairing loss. In addition, since the interference loss between beams represents the interference loss when the current beam is interfered by another beam, it may be considered that the interference loss when the current beam is interfered by the current beam is 0, so $L_{i,j}$ may be set to 0. As a result, as shown in FIG. 11B, a table of interference loss between two beams is finally obtained, e.g., a beam interference loss table of 2-beam pairing as shown in FIG. 12C.

Returning to FIG. 10, in step S1020, inter-beam interference losses of a plurality of beam pairing groups are determined according to the beam priority of each beam and the interference loss between beams. This will be described in greater detail below with reference to FIG. 13A.

Figure 13B:
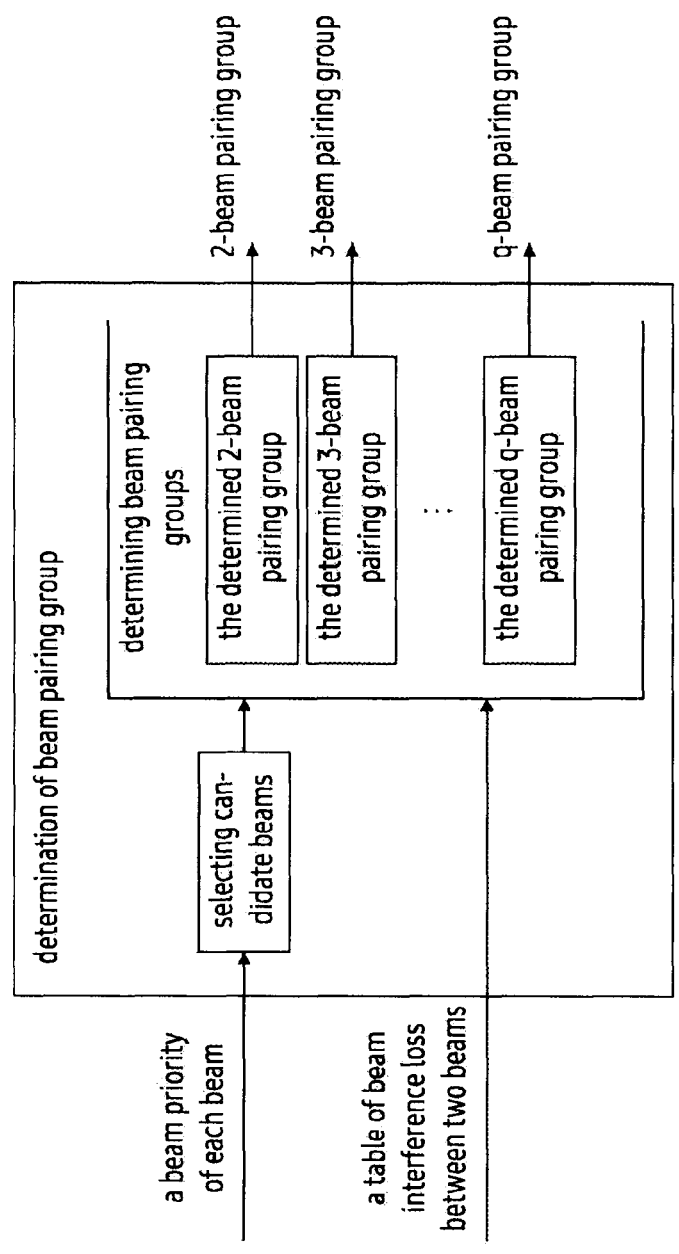
FIG. 13B is a diagram illustrating an example process of determining beam pairing groups according to various embodiments.
Figure 13C:
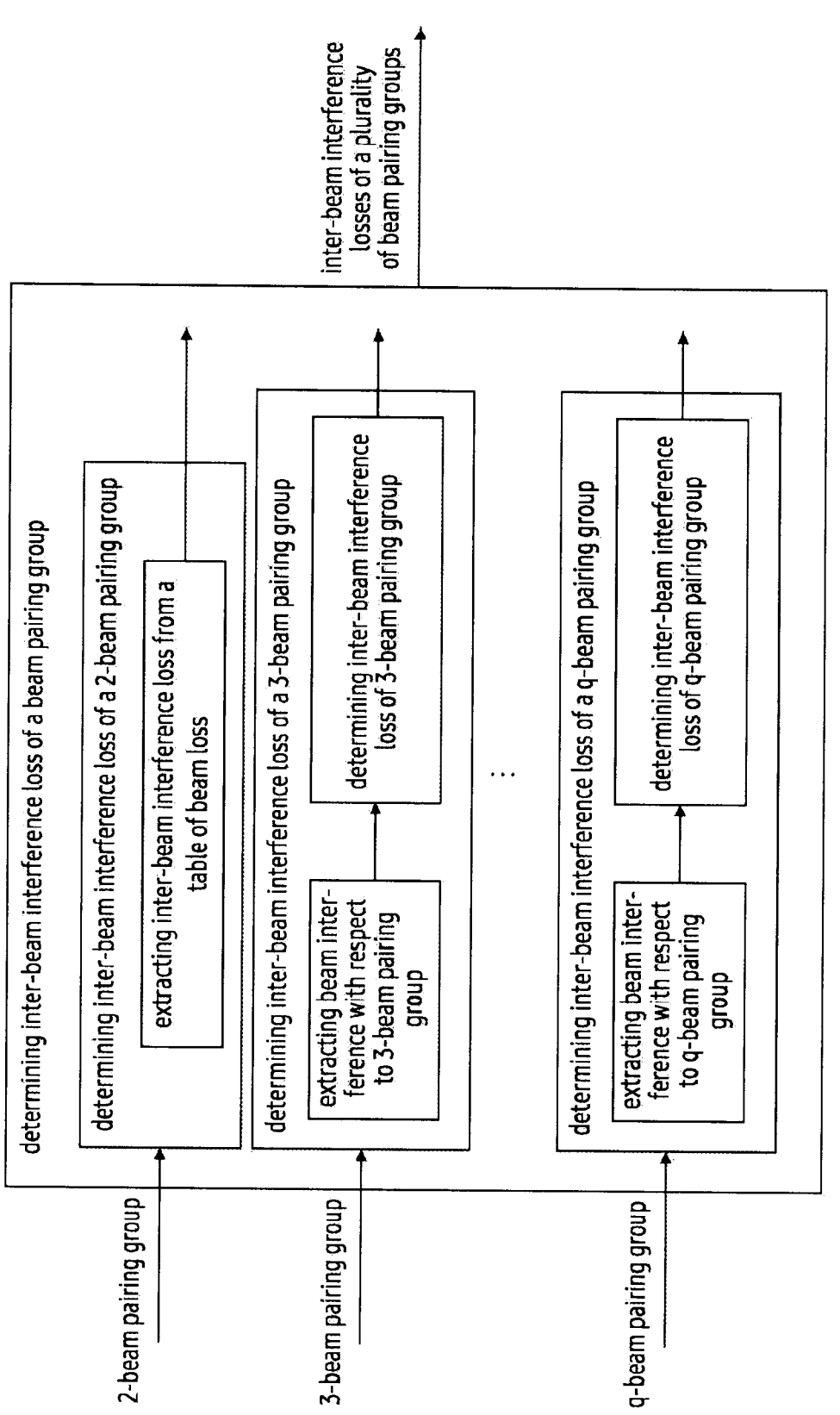
FIG. 13C is a diagram illustrating an example process of determining inter-beam interference loss of each beam pairing group according to various embodiments.

FIG. 13A is a flowchart illustrating an example process of determining inter-beam interference losses of a plurality of beam pairing groups according to a beam priority of each beam and the interference loss between beams according to various embodiments. FIG. 13B is a diagram illustrating an example process of determining a beam pairing group according to various embodiments. FIG. 13C is a diagram illustrating an example process of determining inter-beam interference loss of each beam pairing group according to various embodiments.

As shown in FIGS. 13A and 13B, in step S1310, a first set number of candidate beams are selected from among a plurality of beams according to a beam priority of each beam, for example, M candidate beams are selected, wherein M is settable, for example, an integer greater than or equal to 1.

For example, first, beam priorities of the plurality of beams determined in step S210 are sorted in order from high to low. Then, the first set number of beams are selected from among the plurality of beams as the candidate beams according to the sorted beam priorities. For example, M beams are selected as the candidate beams, M may be any integer such as 25, 30, 32, and so on. However, in order to limit complexity of beam pairing scheduling, M may be set to be less than or equal to a predetermined value, such as 32, however, the present disclosure does not specifically limit the predetermined value.

In step S1320, for each candidate beam, at least one beam are selected from among other beams with respect to each number of at least one preset number of pairing beam, respectively, according to interference loss between the beams, to obtain a corresponding beam pairing group.

For example, first, the interference losses between the beams of a current candidate beam are sorted in a descending order, that is, the interference losses of the current candidate beam from each of other beams in the plurality of beams are sorted in descending order.

For each of the at least one preset number of pairing beam, at least one beam is sequentially selected from among the other beams according to the sorted interference loss, and a beam pairing group corresponding to the number of pairing beam is obtained. Wherein, the other beams refer to the remaining beams in the plurality of beams except the current candidate beam.

For example, assuming that the current candidate beam is beam 5 and the plurality of beams are 50 beams, the interference losses of the current candidate beam from each of the other beams among the 50 beams are sorted in a descending order (that is, 49 interference losses are sorted). For example, the sorted interference losses are $L_{5,1}$, $L_{5,3}$, $L_{5,4}$, $L_{5,9}$, $L_{5,6}$, ..., $L_{5,47}$. Thereafter, according to the sorted interference losses, a beam pairing group is selected from among the 49 beams. For example, if the at least one preset number of pairing beam is {2, 3, ... N}, and N represents the maximum number of pairing beam and is a settable integer greater than or equal to 2, for each number q (taking each value of {2, 3, ... N} sequentially) of the at least one preset number of pairing beam, according to the sorted interference losses, q−1 beams corresponding to the first q−1 interference losses in the sorted interference losses are selected from among the 49 other beams sequentially, to form the beam pairing group corresponding to q (that is, a q-beam pairing group) with the current candidate beam. For example, when q is 2, a beam 1 corresponding to the first q−1 (e.g., one) interference loss $L_{5,1}$ in the sorted interference losses $L_{5,1}$, $L_{5,3}$, $L_{5,4}$, $L_{5,9}$, $L_{5,6}$, ..., $L_{5,47}$, is selected, for example, as shown in FIG. 13G, beam 1 is selected to form a 2-beam pairing group with beam 5 which is the current candidate beam; when q is 3, beams 1 and 3 corresponding to the first q−1 (e.g., 2) interference losses $L_{5,1}$ and $L_{5,3}$ in the sorted interference losses $L_{5,1}$, $L_{5,3}$, $L_{5,4}$, $L_{5,9}$, $L_{5,6}$, ..., $L_{5,47}$ are selected, as shown in FIG. 13G, beams 1 and 3 are selected to form a 3-beam pairing group with beam 5 as the current candidate beam; and so on until the selection of the N-beam pairing group is completed. So far, with respect to beam 5 which is the current candidate beam, multi-group beam pairing groups may be selected, such as the 2-beam pairing group, the 3-beam pairing group, ... the q-beam pairing group as shown in FIG. 13B.

In step S1330, the inter-beam interference loss of each beam pairing group is determined.

As described above, the interference loss between beams determined in step S220 is a interference loss between beams when the number of pairing beam is 2, that is, the table shown in FIG. 12C is a table of beam interference loss when the number of pairing beam is 2. In step S1330, it is necessary to determine the inter-beam interference loss of each of the plurality of beam pairing groups, this beam pairing group may be a 2-beam pairing group including 2 beams, a 3-beam pairing group including 3 beams (that is, a beam pairing group of which the number of pairing beam is 3), or may be an N-beam pairing group including N beams.

If one of the plurality of beam pairing groups is a beam pairing group of which the number of pairing beam is 2, with respect to this beam pairing group, for each beam in the beam pairing group: selecting the interference loss of the current beam when it is interfered by another beam in the beam pairing group, from among the interference loss between the beams determined according to step S220 (e.g., the table of beam interference loss shown in FIG. 12C), as the inter-beam interference loss of the current beam in the beam pairing group. For example, as shown in FIG. 13C, the interference loss of the current beam is directly extracted from the table of beam interference loss shown in FIG. 12C.

Similarly, the inter-beam interference loss of the another beam in the beam pairing group is determined.

If one of the plurality of beam pairing groups is a beam pairing group of which the number of pairing beam is greater than 2, with respect to this beam pairing group, for each beam in the beam pairing group: determining a single-beam data transmission rate when using the current beam for single-beam transmission, determining a beam pairing data transmission rate when using the beam pairing group for transmission, and determining the interference loss when the current beam is interfered by other beams in the beam pairing group as the inter-beam interference loss of the current beam in the beam pairing group, according to the single-beam data transmission rate and the beam pairing data transmission rate.

For example, assuming that for a beam pairing group of which the number of pairing beam is 3, firstly, the single-beam data transmission rate when using one beam (e.g. the current beam) in the beam pairing group for single-beam transmission is determined. This process is the same as the process of calculating the single-beam data transmission rate according to equation (4) described above with reference to step S1130, it may not be repeated here.

The beam pairing data transmission rate when using the beam pairing group for transmission is determined. For example, beam interference caused by the other two beams in the beam pairing group (such as beam j and beam y) for the current beam (such as beam i). For example, beam interference from beam j for beam i is $F_{i,j}$, and beam interference from beam y for beam i is $F_{i,y}$, $F_{i,j}$ and $F_{i,y}$ may be directly obtained from the compensated beam interference, for example, as shown in FIG. 13C, $F_{i,j}$ and $F_{i,y}$ are extracted from the compensated beam interference with respect to the two beams j and y in the 3-beam paring group, and then $F_{i,j,y}=F_{i,j}+F_{i,y}$ is beam interference from beam j and beam y for beam i. A pairing SINR when the current beam is 3-paired with the other two beams in the beam pairing group is calculated. This process is similar to the calculation process of equation (5) described above with reference to step S1130. It only needs to replace $F_{i,j}$ in equation (5) by the beam interference $F_{i,j,y}$ for the current beam caused by the other two beams in the beam pairing group of which the number of paring beam is 3, that is, a pairing $SINR_{i,j,y}=P_i/(P_i/SINR_i+F_{i,j,y})$ when the current beam is 3-paired with the other two beams in the beam pairing group, wherein $P_i$ represents a signal power of the current beam i, and $SINR_i$ represents a SINR when the current beam i is in single-beam transmission. Thereafter, according to a pairing $SINR_{i,j,y}$ when the current beam is 3-paired with the other two beams in the beam pairing group, the beam pairing data transmission rate when using the beam pairing group for transmission is calculated. For example, this process is similar to the calculation process of equation (6) described above with reference to step S1130. It only needs to replace $SINR_{i,j}$ in equation (6) by a pairing $SINR_{i,j,y}$ when the current beam is 3-paired with the other two beams in the beam pairing group of which the number of paring beam is 3. Therefore, it will not be repeated here.

Similarly, when the number of pairing beam takes other integers greater than 3, the process of determining the beam pairing data transmission rate when using the beam pairing group at this time for transmission is similar to the process of calculating the beam pairing data transmission rate when the number of pairing beam is 3 described above, which may not be repeated here.

According to the single-beam data transmission rate and the beam pairing data transmission rate, the interference loss of the current beam when it is interfered by the remaining beams in the beam pairing group is determined as the inter-beam interference loss of the current beam in the beam pairing group. For example, for a 3-beam pairing group of which the number of pairing beam is 3, the interference loss when the current beam is interfered by the remaining beams in the 3-beam pairing group may be determined according to the single-beam data transmission rate of the current beam and the beam pairing data transmission rate of the 3-beam pairing group including the current beam. This process is similar to the calculation process of equation (7) described above with reference to step S1130. It only needs to replace the beam pairing data transmission rate $Rate_{i,j}$ when the current beam i is paired with another beam j by the beam pairing data transmission rate when using the beam pairing group of which the number of pairing beam is 3 for transmission. Therefore, which will not be described here.

It is possible to obtain the interference loss of the current beam when it is interfered by the remaining beams in the beam pairing group of which the number of pairing beam is greater than 2. According to similar processing, the interference loss of each beam in the beam pairing group, of which the number of pairing beam is greater than 2, when it is interfered by the remaining beams, that is, the inter-beam interference loss of each beam in the beam pairing group, of which the number of pairing beam is greater than 2, in the current beam pairing group.

Referring back to FIG. 10, in step S1030, the scheduled beam is selected among the plurality of beams according to the beam priority and the inter-beam interference loss of each beam. This will be described in greater detail below with reference to FIG. 13D.

Figure 13D:
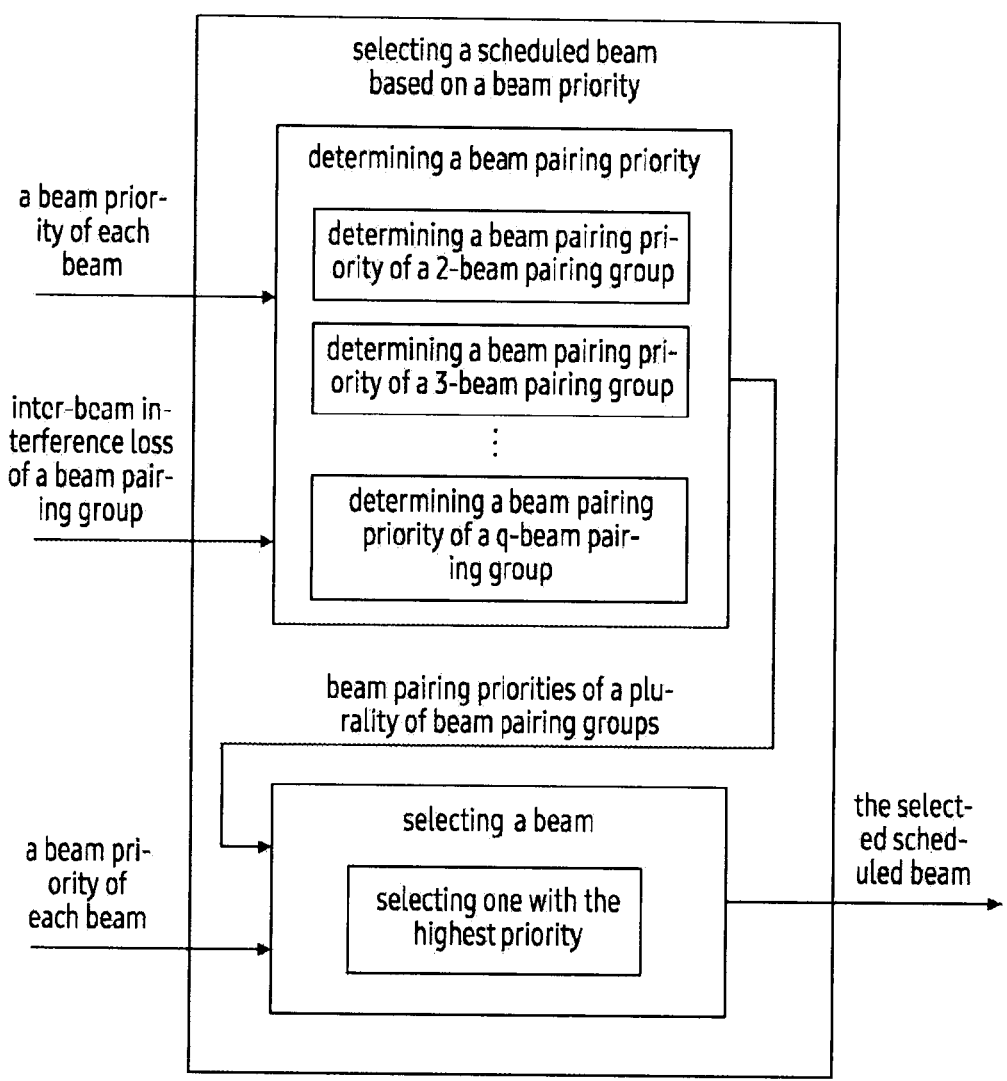
FIG. 13D is a diagram illustrating an example process of selecting a scheduled beam according to various embodiments.

For example, as shown in FIG. 13D, a single-beam with the highest beam priority is selected from among the plurality of beams according to the beam priority of each beam. For example, in some situations, a data transmission efficiency of the beam pairing group may not be better than an efficiency of single-beam transmission. Therefore, when selecting the scheduled beam, it is also necessary to consider a situation when using single-beam transmission. Therefore, the single-beam with the highest beam priority is selected from among the plurality of beams as a candidate scheduled beam.

A beam pairing priority of each beam pairing group in the plurality of beam pairing groups is determined according to the beam priority and the inter-beam interference loss, and a beam pairing group with the highest beam pairing priority is selected from among the plurality of beam pairing groups.

For example, the determining the beam pairing priority of each beam pairing group in the plurality of beam pairing groups according to the beam priority and the inter-beam interference loss includes operations for each of the plurality of beam pairing groups of: determining compensated beam priority of each beam according to the beam priority and corresponding inter-beam interference loss of each beam in the current beam pairing group; determining beam pairing priority of the current beam pairing group according to the compensated beam priority of each beam in the current beam pairing group. As shown in FIG. 13D, the operation of determining the beam pairing priority may finally determine the beam pairing priorities of the plurality of beam pairing groups, for example, a beam pairing priority of the 2-beam pairing group, a beam pairing priority of the 3-beam pairing group, . . . and a beam pairing priority of q-beam pairing group.

For example, the compensated beam priority may be calculated according to the following equation (8):

$$\text{Level}'_i = \text{Level}_i \times L_i(m) \tag{8}$$

Wherein $\text{Level}_i$ is a beam priority of the current beam i, $\text{Level}'_i$ is the compensated beam priority of the current beam i, and $L_i(m)$ is inter-beam interference pairing loss of the current beam i in the beam pairing group of which the number of pairing beam is m, wherein m is a positive integer greater than or equal to 2.

The beam pairing priority of the beam pairing group of which the number of pairing beam is m may be calculated according to the following equation (9):

$$\text{LEVEL}_m = \sum_i^I \text{Level}'_i \tag{9}$$

Where $\text{LEVEL}_m$ represents the beam pairing priority of the beam pairing group of which the number of pairing beam is m, and I represents the number of beams included in the beam pairing group of which the number of pairing beam is m.

For each of the plurality of beam pairing groups, its beam pairing priority may be determined according to the above process. A beam pairing group with the highest beam pairing priority is selected from among the plurality of beam pairing groups. As shown in FIG. 13D, the operation of selecting beam may select the beam pairing group with the highest beam pairing priority from among the plurality of beam pairing groups according to the beam pairing priority One beam pairing group with the highest priority is selected from the single-beam with the highest beam priority and the beam pairing group with the highest beam pairing priority as the scheduled beam. For example, the highest beam priority is compared with the highest beam pairing priority, one with the highest priority of the single-beam and the beam pairing group is selected as the scheduled beam(s) according to a comparison result, as shown in FIG. 13D, and one with the highest priority is selected as the scheduled beam(s). For example, the highest beam pairing priority of the beam pairing group is the highest, the beam pairing group is selected as the scheduled beams. The beam(s) selected through the above process may improve the system throughput and ensure the user experience.

Figure 13E:
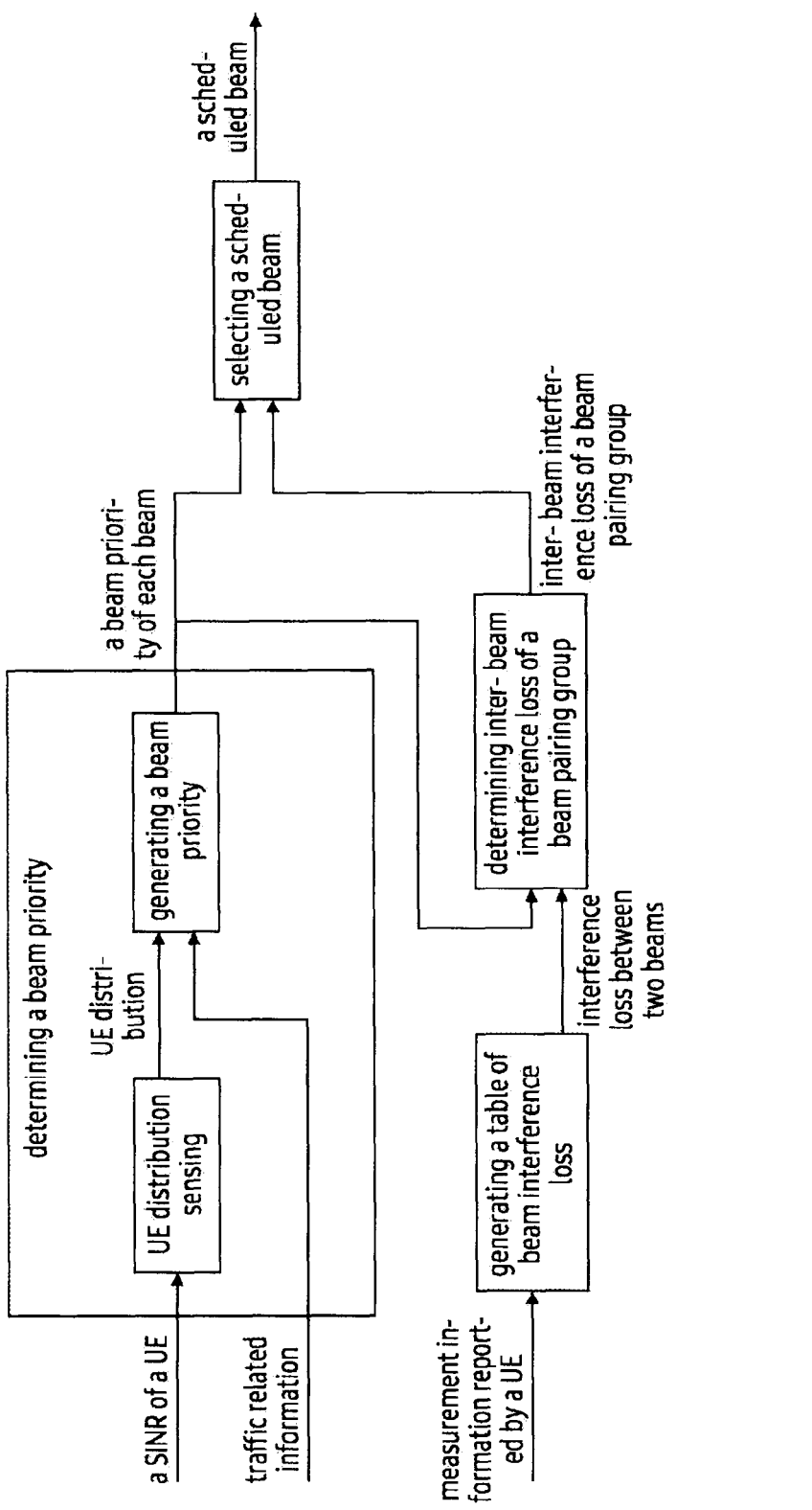
FIG. 13E is a diagram illustrating an example method performed by a network node according to various embodiments.

FIG. 13E is a diagram illustrating an example method performed by a network node according to various embodiments.

Figure 13F:
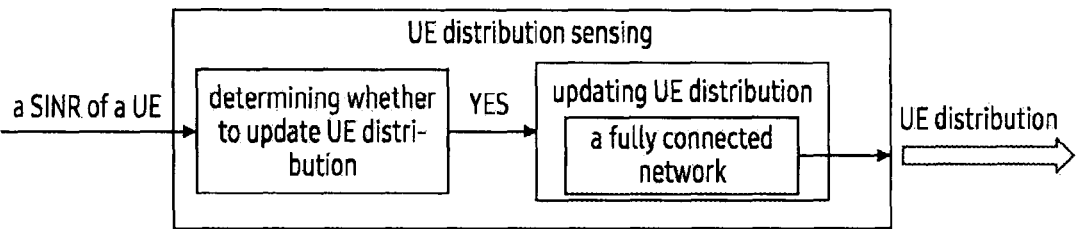
FIG. 13F is a diagram illustrating an example process of UE distribution sensing according to various embodiments.
Figure 13G:
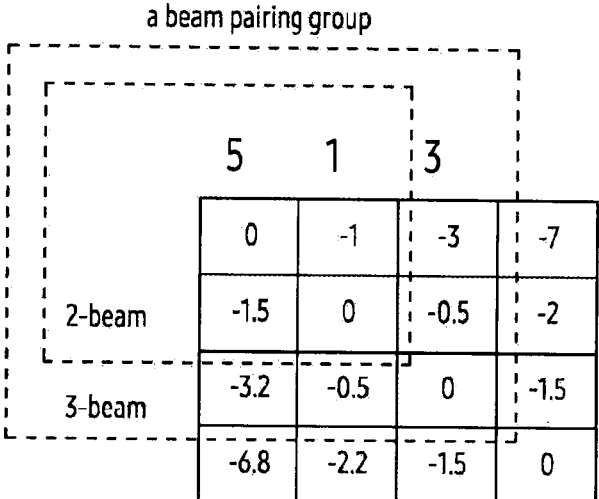
FIG. 13G is a diagram illustrating an example of a beam pairing group according to various embodiments.

As shown in FIG. 13E, UE distribution is acquired using UE distribution sensing, and beam priority of each beam in the UE distribution is determined according to the acquired UE distribution and traffic related information about each beam. Wherein, in the UE distribution sensing process shown in FIG. 13F, when acquiring the UE distribution, firstly whether to update the UE distribution is determined. If it is necessary to update the UE distribution, the UE distribution is determined using a SINR of the UE using a fully connected network, so as to acquire the UE distribution.

In addition, as shown in FIG. 13E, a table of interference loss is generated using measurement information reported by a UE, for example, interference loss between beams of a 2-beam pairing group (that is, interference loss between the two beams). Inter-beam interference loss of the beam pairing group is determined using the determined beam priority of each beam and the interference loss between beams (that is, the interference loss between the two beams). A scheduled beam is selected according to the beam priority and the inter-beam interference loss of the beam pairing group.

In the above description, the used fully connected network is a trained fully connected network. A training manner may be offline-training. However, in an actual communication system, there are different kinds of UE distribution in different cells, so the present disclosure may also obtain the fully connected network through online-training. The training may be performed by the above network node or other network nodes. For example, the fully connected network is online-trained by Operation Administration and Maintenance (OAM) to adapt to different UE distribution in each cell, that is, the fully connected network used by the method performed by the network node described above may also be an online-trained fully connected network received from the outside by the network node. How to obtain a fully connected network through online-training is described in greater detail below with reference to FIG. 14A and FIG. 14B.

Figure 14B:
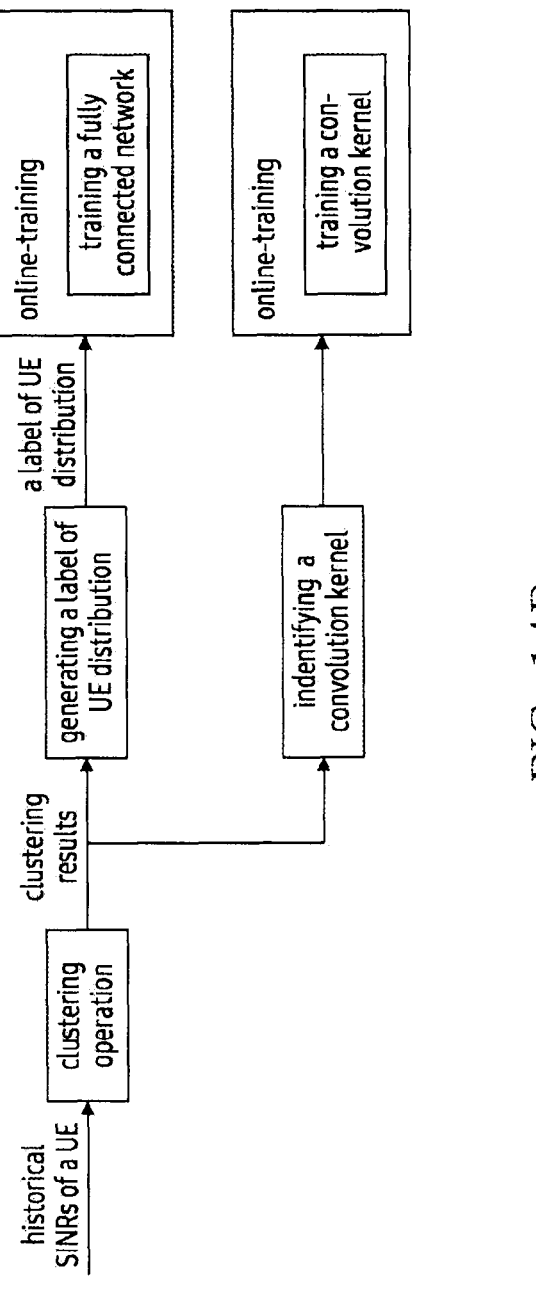
FIG. 14B is a diagram illustrating an example process of online-training of a fully connected network and a convolution kernel according to various embodiments.

FIG. 14A is a diagram illustrating example deployment between a network node, to which the method according to various embodiments is applied, and other network nodes (taking an OAM as an example). FIG. 14B is a diagram illustrating an example process of online-training of a fully connected network and a convolution kernel according to various embodiments.

In an embodiment of the present disclosure, as shown in (a) of FIG. 14A, OAM may send an offline-trained fully connected network or an online-trained fully connected network to the network node. The network node may deploy a model internally, and the network node periodically reports the acquired measurement data to OAM, then the OAM trains the fully connected network according to the data received from the network node.

For example, if the network node is not a base station, after the network node determines the beam to be scheduled (e.g. a beam scheduling scheme) according to the method described above, it sends the determined beam scheduling scheme to the base station. The base station may control, for example, the a Physical-Controller (PHY-C) to complete beam transmission, and the PHY-C periodically sends the measurement data to a Medium Access control (MAC) module, the network node acquires the measurement data from the MAC module of the base station and periodically reports the acquired measurement data to the OAM.

If the network node is a base station, as shown in (b) of FIG. 14A, the base station may deploy the model in the Distributed Unit (DU), such as in the media access control (MAC) module of the DU unit. Thereafter, the base station determines a scheduled beam according to the method described above, and controls, for example, a Physical-Controller (PHY-C) to complete beam transmission. In addition, the PHY-C periodically sends measurement data to the MAC module for beam scheduling and subsequent model training. Then, the MAC module collects data and periodically reports the same to the OAM, and then OAM trains the fully connected network according to the data received from the network node.

However, the disclosure is not limited to this. For example, if the network node is not a base station, the network node sends the determined beam scheduling scheme to the base station, and the base station completes the beam scheduling according to the received beam scheduling scheme, and periodically reports the measured data directly to the OAM, which may save bandwidth and transmission time.

The following describes in greater detail how to train the fully connected network.

For example, as shown in FIG. 14B, when training the fully connected network, firstly, the UE distribution of a current cell is classed by a clustering algorithm, based on the collected historical SINRs of UEs from the network node, wherein the clustering algorithm may be a k-means algorithm, DSBCAN algorithm, hierarchical clustering algorithm, etc. For different cells, the number of UE distributions may be different, that is, the number of UE distributions may vary according to an UE distribution scenario of each cell in actual. In addition, the clustering algorithm may not determine the specific distribution of UE in each class of UE distribution, but may only determine the number of classes of UE distribution, that is, it may only determine the total number of UE distribution.

As shown in FIG. 14B, a label of at least one UE distribution is generated according to a classification result. For example, if the total number of UE distribution classified according to the clustering algorithm is H, a corresponding label is generated for each class of UE distribution, for example, 1, 2, 3 . . . H.

As shown in FIG. 14B, the fully connected network is trained according to the generated label of the at least one UE distribution. For example, for a UE distribution, the fully connected network is trained, according to the normalized predetermined number of average SINRs received from the network node in the UE distribution, and by the label of the UE distribution determined by the clustering algorithm which are input into the fully connected network. Since the above has described how to determine the normalized predetermined number of average SINRs with reference to FIG. 6, this may not be repeated here.

Through the above online-training, a fully connected network suitable for the cell in the current environment may be obtained, and then the network node may use the fully connected network to obtain more accurate UE distribution, and if an OAM trains the fully connected network or other network nodes train the fully connected network, the OAM or other nodes may send the trained fully connected network to the network node.

Similarly, the convolution kernel described above for determining the beam priority of each beam in a UE distribution may be offline-trained or online-trained, the convolution kernel may be trained by the network node, or it may be an online-trained convolution kernel received from the outside. Similar to the above description, the OAM or other nodes may send the offline trained or online-trained convolution kernel to the network node, and the network node may deploy the convolution kernel internally. For example, if the network node is a base station, the base station may deploy the convolution kernel in a DU unit, such as a MAC module of the DU unit. As shown in FIG. 14B, before online-training of convolution kernel, the OAM needs to identify the convolution kernel to be trained. At this time, based on the UE distribution determined by the classification result of clustering algorithm, the OAM determines the convolution kernel corresponding to the UE distribution, and then trains the convolution kernel. This will be described below with reference to FIGS. 15A and 15B.

Figure 15B:
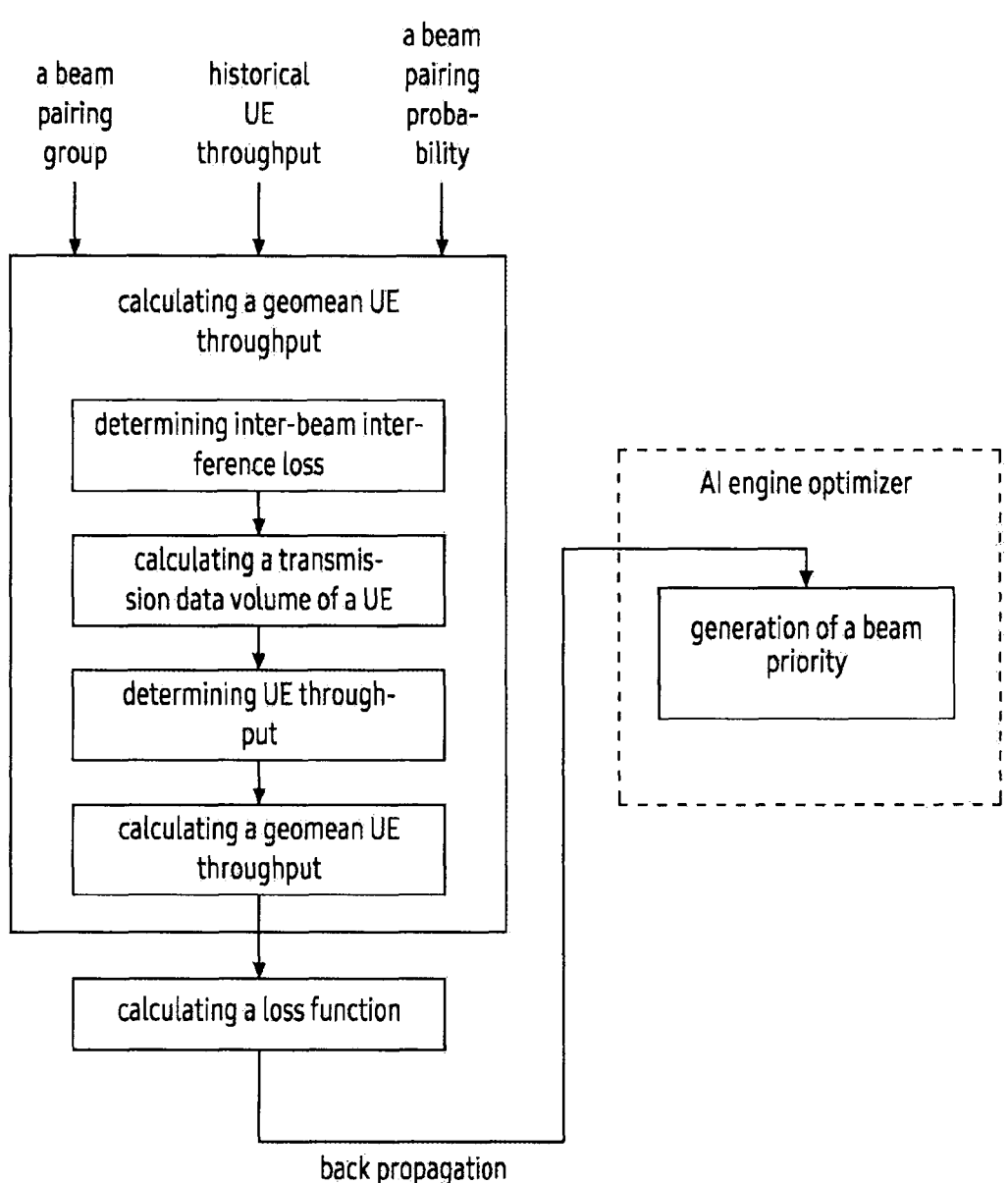
FIG. 15B is a diagram illustrating an example process of training a convolution kernel according to various embodiments.

FIG. 15A is a flowchart illustrating an example process of training a convolution kernel according to various embodiments. FIG. 15B is a diagram illustrating an example process of training a convolution kernel according to various embodiments.

As shown in FIG. 15A, in step S1510, a plurality of geomean UE throughputs are obtained, by calculating a geomean UE throughput of each of a plurality of beam pairing groups according to information received from a network node. This will be described in greater detail below with reference to FIGS. 15B and 16.

FIG. 16 is a flowchart illustrating an example process of calculating geomean UE throughput of a beam pairing group according to various embodiments.

As shown in FIG. 16, in step S1610, with respect to each beam in a current beam pairing group, a transmission data volume at a current moment of a current UE on a current beam is calculated according to the information received from the network node.

For example, inter-beam interference losses of a plurality of beam pairing groups may be received from the network node, as shown in FIG. 15B, the inter-beam interference loss is determined firstly. Therefore, for a current beam i in a current beam pairing group m, a inter-beam interference loss $L_i(m)$ of the current beam i in the beam pairing group, of which the number of pairing beam is m, is directly determined according to the inter-beam interference loss of the beam pairing group received from the network node, and according to the inter-beam interference loss $L_i(m)$ of the current beam i in the beam pairing group, a SINR when the current beam i is in single-beam transmission, received from the network node (for example, a SINR of the first UE with the highest priority on the current beam i), and the number Num of beams in the current beam pairing group m, the number of transmission bits on one physical resource block, MPR, is calculated according to the following equation (10):

$$MPR=\log 2(1+(SINR \times L_i(m)/Num)) \qquad (10)$$

The transmission data volume TSize at the current moment of the current UE on the current beam according to the following equation:

$$TSize=\min(BO, MPR \times available\_PRB) \qquad (11)$$

Wherein BO represents the number of data bits to be transmitted of the current UE on the current beam, available_PRB represents all available physical resource blocks related to the current beam. For example, as shown in FIG. 15B, the transmission data volume at the current moment of the UE is calculated.

If the TSize is the BO, it indicates available physical resource blocks remaining after transmission of the current UE on the current beam. In this case, it is necessary to use the equation (10) to calculate MPR for a UE with the next priority on the current beam. At this time, the SINR in the equation (10) is a SINR of the UE with the next priority, and then a TSize for the UE with the next priority is calculated according to the equation (11), at this time, available_PRB in the equation (11) is the number of available physical resource blocks remaining after the physical resource blocks used by the UE with the highest priority are removed, and so on, until there are no longer available physical resource blocks on the current beam with respect to a UE with a certain priority on the current beam.

In step S1620, with respect to each beam in the current beam pairing group, UE throughput of the current UE is determined according to the calculated UE transmission data volume at the current moment of the current UE, and historical UE throughput thereof.

For example, the UE throughput at the current moment UE_Thr_Current is calculated according to the following equation (12):

$$UE\_Thr\_Current=TSize/TTI\_time \qquad (12)$$

Wherein, TTI_time indicates time required for UE to transmit once. Then, filtered UE throughput is updated according to the following equation (13), that is, the UE throughput of the current UE UE_Thr_Filtered:

$$UE\_Thr\_Filtered = (1-filter) \times UE\_Thr\_His + filter \times UE\_Thr\_Current \quad (13)$$

Wherein, UE_Thr_His represents the historical UE throughput of the current UE, which may be an average value obtained, by the base station averaging a plurality of historical UE throughputs at a plurality of moments recorded by the current UE, filter represents a filter factor, which is configurable and may be configured as 0.1, 0.01, 0.001, etc., which may be configured as 0.01 by default.

As shown in FIG. 15B, the UE throughput of UE on each beam in the current beam pairing group may be determined or updated.

In step S1630, a geomean UE throughput of the current beam pairing group is calculated according to the UE throughputs of UEs on all beams in the determined current beam pairing group.

For example, the geomean UE throughput UE of the current beam pairing group UE_Thr_Geo may be calculated according to equation (14) below:

$$UE\_Thr\_Geo = \exp\left(\frac{1}{N_{UE\_Filtered} + N_{UE\_unFiltered}}\left(\sum_{k=1}^{N_{UE\_Filtered}}\log(UE\_Thr\_Filtered(k)) + \sum_{v=1}^{N_{UE\_unFiltered}}\log(UE\_Thr\_unFiltered(v))\right)\right) \quad (14)$$

Wherein, $N_{UE\_Filtered}$ represents the number of UEs, of which the filtered UE throughput is updated according to equation (13) above at the current moment, in the current beam pairing group. $N_{UE\_unFiltered}$ represents the number of UEs, of which the filtered UE throughput is not updated according to equation (13) above at the current moment, in the current beam pairing group. UE_Thr_unFiltered represents UE throughput of the v-th UE in the current beam pairing group in a case that the filtered UE throughput is not updated according to equation (13) above at the current moment, which is equal to the UE throughput of the v-th UE at the current moment UE_Thr_Current.

As shown in FIG. 15B, it is possible to determine the geomean UE throughput of the current beam pairing group. According to a similar method, geomean UE throughputs of each beam pairing group in the plurality of beam pairing groups may be determined, so as to obtain the plurality of geomean UE throughputs.

Referring back to FIG. 15A, in step S1520, a target loss function is calculated, according to the plurality of geomean UE throughputs, and a beam pairing probability of each beam pairing group received from the network node, as shown in FIG. 15B.

For example, the target loss probability may be calculated according to the following equation (15):

$$Function_{Loss} = -\sum_i^{Np}(UE\_Thr\_Geo(i) \times Probability(i)) \quad (15)$$

Wherein, Probability(i) represents a beam pairing probability of the i-th beam pairing group and is obtained directly from the network node. In the network node, information of a beam pairing priority of the beam pairing group is input into a softmax function to determine the beam pairing probability of each beam pairing group. Np indicates the number of beam pairing groups.

In step S1530, a convolution kernel is trained according to the target loss function. For example, as shown in FIG. 15B, the training of the convolution kernel is completed when the target loss function converges, based on back propagation, an AI engine optimizer trains the convolution kernel according to the target loss function, and the convolution kernel may be sent to the network node after the target loss function converges and a new convolution kernel is obtained. When the network node uses the fully connected network to determine that the current UE distribution is the UE distribution corresponding to the convolution kernel, the network node may use the convolution kernel to determine beam priorities of all beams in the current UE distribution, that is, perform a beam priority generation process as shown in FIG. 15B.

FIG. 17 is a flowchart illustrating an example method performed by a network node according to various embodiments.

As shown in FIG. 17, in step S1710, interference loss between beams is determined based on measurement information reported by a UE and a beam physical resource usage rate. Since this step is the same as step S1010 described above with reference to FIG. 10, this description may not be repeated here.

In step S1720, inter-beam interference losses of a plurality of beam pairing groups are determined based on the interference loss between the beams.

For example, based on the interference loss between the beams, the determining the inter-beam interference losses of the plurality of beam pairing groups includes: acquiring a beam priority of each beam in the plurality of beams.

In an embodiment of the present disclosure, the acquired beam priority may be a priority of each beam determined according to step S220 of FIG. 2 above, or a priority of each beam determined by any existing method.

Based on the interference loss between the beams, the determining the inter-beam interference losses of the plurality of beam pairing groups further includes: selecting a first set number of candidate beams from among the plurality of beams according to the beam priority; for each candidate beam, selecting at least one beam from among other beams with respect to each number of at least one preset number of pairing beams, respectively, according to the interference loss between the beams, to obtain a corresponding beam pairing group; and determining the inter-beam interference loss of each beam pairing group. Since these steps are the same as the process described above with reference to FIG. 13A, this description will not be repeated here.

In step S1730, a scheduled beam is selected among the plurality of beams based on the inter-beam interference loss.

For example, based on the inter-beam interference loss, the selecting the scheduled beam among the plurality of beams includes: selecting a single-beam with the highest beam priority from among the plurality of beams according to the beam priority; determining a beam pairing priority of each beam pairing group in the plurality of beam pairing groups according to the beam priority and the inter-beam interference loss, and selecting a beam pairing group with the highest beam pairing priority from among the plurality of beam pairing groups; selecting one with the highest beam priority from the single-beam with the highest beam priority and the beam pairing group with the highest beam pairing priority as the scheduled beam. Since these steps are the same as the process described above with reference to step S1030 of FIG. 10, this may not be repeated here.

Figure 18:
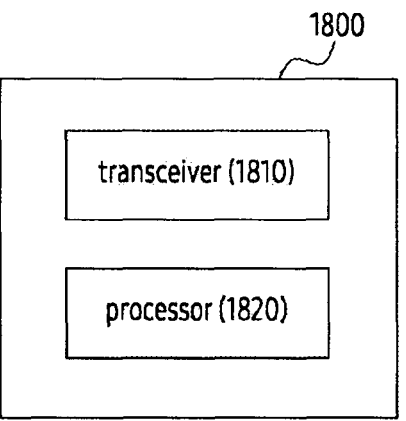
FIG. 18 is a block diagram illustrating an example configuration of a network node according to various embodiments.

FIG. 18 is a block diagram illustrating an example configuration of a network node 1800 according to various embodiments.

As shown in FIG. 18, the network node 1800 includes a transceiver 1810 and a processor (e.g., including processing circuitry) 1820, wherein the processor 1820 is coupled to the transceiver 1810 and is configured to perform the method performed by the network node described above with reference to FIGS. 2 to 13G and FIG. 17. For details of the operation of the above method performed by the network node, refer to the description of FIGS. 2 to 13G and FIG. 17, which may not be repeated here.

The example embodiments may determine a real-time UE distribution through a fully connected network, and then determine a dynamic beam priority according to the UE distribution, and may determine a dynamic interference loss according to measurement information reported by a UE in real time and beam physical resource usage rate, and then determine a dynamic inter-beam interference pair loss according to the dynamic beam priority, the beam pairing priority is determined by considering an inter-beam interference loss and a beam priority at the same time to select a beam pairing group with the highest priority so as to improve a system throughput and ensure user experience.

The above describes the method performed by the network node and the corresponding network node of the present disclosure, respectively. The following is a comparison with the prior art in terms of the effect of applying the method.

For example, training data used for generating a fully connected network and a plurality of convolutional kernels which determine a beam priority may be generated according to the UE distribution shown in Table 1 below.

TABLE 1

| UE distribution | UE distribution ratio |
|---|---|
| UE distribution index 1 | Uniform distribution, that is, a ratio of UEs locating in a center: middle: edge of a cell = 3:4:3 |
| UE distribution index 2 | Most UEs are in a center of a cell, that is, a ratio of UEs locating in a center: middle: edge of a cell = 8:1:1 |
| UE distribution index 3 | Most UEs are in the middle of the cell, that is, a ratio of UEs locating in a center: middle: edge of a cell = 1:8:1 |
| UE distribution index 4 | Most UEs are at the edge of the cell, that is, a ratio of UEs locating in a center: middle: edge of a cell = 1:1:8 |

Table 2 shows test scenarios of the method performed by the network node of the present disclosure and the existing scheme:

TABLE 2

| Scenario 1: predefined UE distribution | UE distribution ratio is the same as training data in Table 1 |
|---|---|
| | UE locations are the same as training data in Table 1 |
| Scenario 2: random UE distribution | UE distribution is random, that is, a ratio of UE distribution (a ratio of UE locating in a center: middle: edge of a cell) is generated randomly |
| | UE locations are different from training data in Table 1 |

Figure 19A:
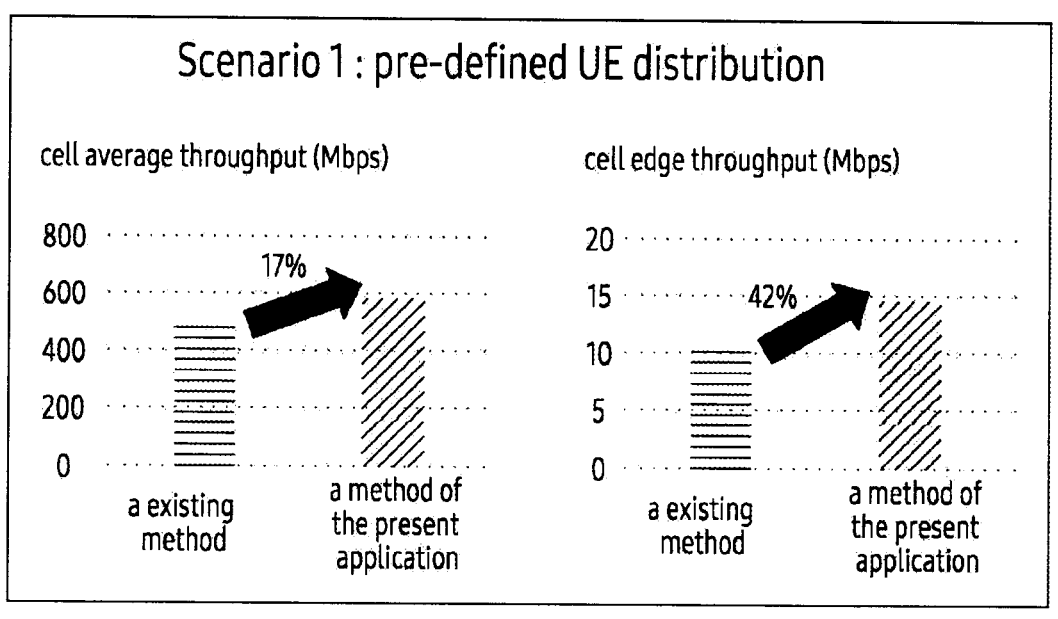
FIGS. 19A and 19B are diagrams illustrating an example effect comparison between an existing method and the method of selecting beams of the present disclosure according to various embodiments.
Figure 19B:
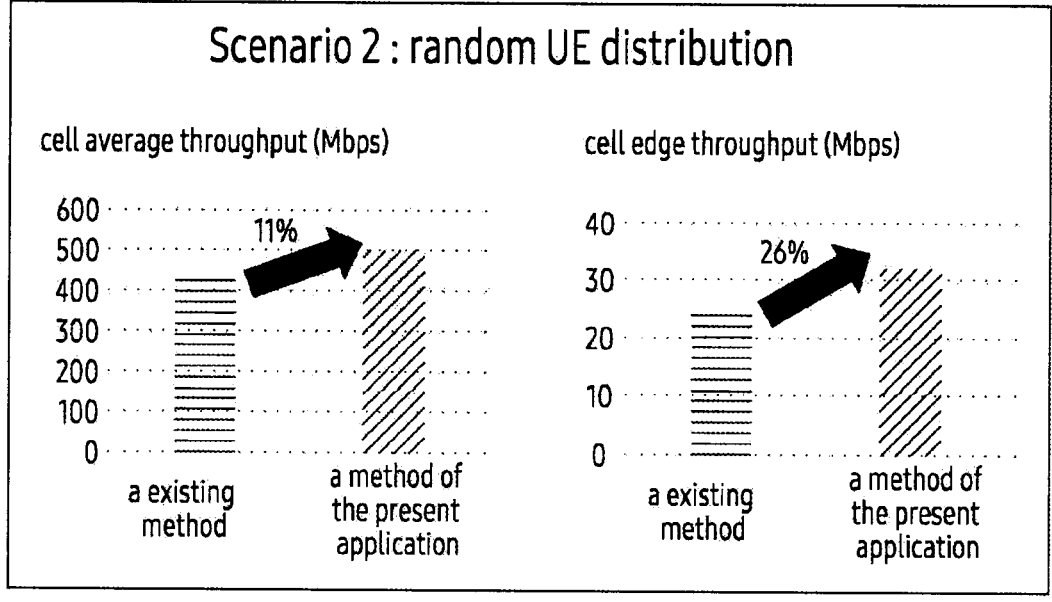

The test results are shown in FIG. 19. As may be seen from FIG. 19, for Scenario 1, using the method performed by the network node described in FIG. 2 of the present disclosure, the cell average throughput increased by 17%, and the cell edge throughput increased by 42%; for Scenario 2, using the method performed by the network node described in FIG. 2 of the present disclosure, the cell average throughput increased by 11% and the cell edge throughput increased by 26%. It may be seen that the method of the present disclosure has good generalization and may adapt to different UE distribution scenarios.

Figure 20:
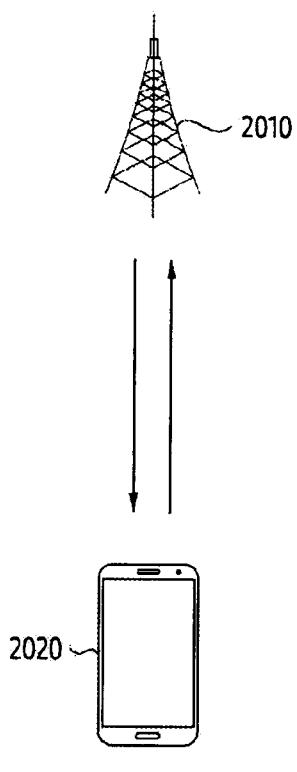
FIG. 20 is a diagram illustrating an example of a wireless communication system according to various embodiments.

FIG. 20 is a diagram illustrating an example of a wireless communication system according to various embodiments.

Referring to FIG. 20, it illustrates a base station 2010 and a terminal 2020 as parts of nodes using a wireless channel in a wireless communication system. Although FIG. 20 illustrates only one base station, the wireless communication system may further include another base station that is the same as or similar to the base station 2010.

The base station 2010 is a network infrastructure that provides wireless access to the terminal 2020. The base station 2010 may have a coverage defined based on a distance capable of transmitting a signal. In addition to the term 'base station', the base station 2010 may be referred to as 'access point (AP)', 'eNodeB (eNB)', '5th generation node', 'next generation nodeB (gNB)', 'wireless point', 'transmission/reception', or other terms having the same or equivalent meaning thereto.

The terminal 2020, which is a device used by a user, performs communications with the base station 2010 through a wireless channel. A link from the base station 2010 to the terminal 2020 is referred to as a downlink (DL), and a link from the terminal 2020 to the base station 2010 is referred to as an uplink (UL). Further, although not shown in FIG. 20, the terminal 2020 and other terminals may perform communications with each other through the wireless channel. In this context, a link between the terminal 2020 and another terminals (device-to-device link, D2D) is referred to as a side link, and the side link may be used mixed with a PC5 interface. In some other embodiments of the disclosure, the terminal 2020 may be operated without any user's involvement. According to an embodiment of the disclosure, the terminal 2020 is a device that performs machine-type communication (MTC) and may not be carried by a user. In addition, according to an embodiment of the disclosure, the terminal 2020 may be a narrowband (NB)-Internet of things (IoT) device.

The terminal 2020 may be referred to as 'user equipment (UE), 'customer premises equipment (CPE), 'mobile station', 'subscriber station', 'remote terminal', 'wireless terminal', 'electronic device', 'user device', or any other term having the same or equivalent technical meaning thereto.

The base station 2010 may perform beamforming with the terminal 2020. The base station 2010 and the terminal 2020 may transmit and receive radio signals in a relatively low frequency band (e.g., FR 1 (frequency range 1) of NR). Further, the base station 2010 and the terminal 2020 may transmit and receive radio signals in a relatively high frequency band (e.g., FR 2 of NR (or FR 2-1, FR 2-2, FR 2-3), FR 3, or millimeter wave (mmWave) bands (e.g., 28 GHz, 30 GHz, 38 GHz, 60 GHz)). In order to improve the channel gain, the base station 2010 and the terminal 2020 may perform beamforming. In this context, the beamforming may include transmission beamforming and reception beamforming. The base station 2010 and the terminal 2020 may assign directionality to a transmission signal or a reception signal. To that end, the base station 2010 and the terminal 2020 may select serving beams through a beam search or beam management procedure. After the serving beams are selected, subsequent communication may be performed through a resource having a quasi-co located (QCL) relationship with a resource that has transmitted the serving beams.

A first antenna port and a second antenna port may be evaluated to be in such a QCL relationship, if the wide-scale characteristics of a channel carrying symbols on the first antenna port can be estimated from a channel carrying symbols on the second antenna port. For example, the wide-scale characteristics may include at least one of delay spread, Doppler spread, Doppler shift, average gain, average delay, and spatial receiver parameters.

Although in FIG. 20, both the base station 2010 and the terminal 2020 are described as performing beamforming, embodiments of the disclosure are not necessarily limited thereto. In some embodiments of the disclosure, the terminal may or may not perform beamforming. Likewise, the base station may or may not perform beamforming. That is to say, only either one of the base station and the terminal may perform beamforming, or both the base station and the terminal may not perform beamforming.

In the disclosure, a beam means a spatial flow of a signal in a radio channel, and may be formed by one or more antennas (or antenna elements), of which formation process may be referred to as beamforming. The beamforming may include at least one of analog beamforming and digital beamforming (e.g., precoding). Reference signals transmitted based on beamforming may include, for example, a demodulation-reference signal (DM-RS), a channel state information-reference signal (CSI-RS), a synchronization signal/physical broadcast channel (SS/PBCH), or a sounding reference signal (SRS). Further, for a configuration for each reference signal, an IE, such as a CSI-RS resource, an SRS-resource, or the like may be used, and the configuration may include information associated with a beam. Beam-associated information may refer to whether a corresponding configuration (e.g., CSI-RS resource) uses the same spatial domain filter as other configuration (e.g., another CSI-RS resource within the same CSI-RS resource set) or uses a different spatial domain filter, or with which reference signal is QCL, or if QCLed, what type (e.g., QCL type A, B, C, or D) it has.

According to the related art, in a communication system with a relatively large cell radius of a base station, each base station was installed so that the respective base station includes functions of a digital processing unit (or distributed unit (DU)) and a radio frequency (RF) processing unit (or radio unit (RU)). However, as high-frequency bands are used in 4th generation (4G) systems and/or its subsequent communication systems (e.g., fifth-generation (5G), and the cell coverage of a base station decreased, the number of base stations to cover a certain area has increased. Thus, it led to more increased burden of initial installation costs for communication providers to install more base stations. In order to reduce the installation costs of the base station, a structure has been proposed in which the DU and the RU of the base station are separated so that one or more RUs are connected to one DU through a wired network and one or more RUs geographically distributed are arranged to cover a specific area.

For example, A method performed by a network node, comprises acquiring user equipment (UE) distribution, determining a beam priority of each of a plurality of beams based on the UE distribution, and selecting a scheduled beam among the plurality of beams based on the beam priority.

For example, the acquiring the UE distribution comprises determining whether to update the UE distribution and acquiring the UE distribution using measurement information reported by the UE through a fully connected network, based on determining that the UE distribution needs to be updated.

For example, the acquiring the UE distribution using the measurement information reported by the UE through the fully connected network comprises acquiring an average signal interference plus noise ratio (SINR) of each UE in a cell within a specified period, selecting a specified number of average SINRs from among a plurality of acquired average SINRs of a plurality of UEs, normalizing each of the specified number of average SINRs, inputting the specified number of normalized average SINRs into the fully connected network to determine a probability value, and determining one of multiple UE distributions corresponding to the probability value as the UE distribution.

For example, the determining whether to update the UE distribution comprises determining to update the UE distribution based a specified event occurring and/or based on the current time meeting an updating trigger period.

For example, it is determined that the specified event occurs based on a change in the number of UEs in a cell meeting a first specified condition and/or based on a change of an average SINR of UEs in the cell meeting a second specified condition.

For example, the updating trigger period is determined by: calculating an SINR variance of all UEs in the current cell within a specified duration and selecting one of a plurality of periods as the updating trigger period according to the SINR variance.

For example, the determining the beam priority of each of the plurality of beams based on the UE distribution comprises selecting one convolution kernel corresponding to the UE distribution from among a plurality of convolution kernels and inputting traffic related information about each of the plurality of beams to the one selected convolution kernel for convolution processing to determine the beam priority of each beam in the UE distribution.

For example, the traffic related information comprises at least one of Signal to Interference plus Noise Ratio (SINR), average throughput, and amount of traffic to be transmitted.

For example, the selecting the scheduled beam among the plurality of beams based on the beam priority comprises determining interference loss between beams according to the measurement information reported by the UE and/or a beam physical resource usage rate, determining inter-beam interference losses of a plurality of beam pairing groups according to the beam priority and the interference loss between the beams, and selecting the scheduled beam among the plurality of beams according to the beam priority and the inter-beam interference loss.

For example, the determining the interference loss between beams according to the measurement information reported by the UE and/or the beam physical resource usage rate comprises determine beam interference between beams according to the measurement information reported by the UE, compensating the beam interference between the beams according to the beam physical resource usage rate, and determining the interference loss between the beams according to the compensated beam interference.

For example, the determining the beam interference between beams according to the measurement information reported by the UE comprises for a beam for which a inter-beam interference power is obtained by UE reporting among the plurality of beams, determining beam interference from another beam for the beam, according to the inter-beam interference power for the beam from the another beam, reported by at least one UE on the beam and for a beam for which the inter-beam interference power is not obtained by UE reporting, obtaining beam interference from another beam in the plurality of beams for the beam, by interpolation according to the beam interference and/or a signal power of a beam, wherein the signal power of the beam is determined according to a signal power of the beam reported by the at least one UE on the beam.

For example, the compensating the beam interference between the beams according to the beam physical resource usage rate comprises operations for the each determined beam interference of determining a compensation factor corresponding to a current beam interference according to the respective beam physical resource usage rates of a current beam and another beam corresponding to the current beam interference and compensating the current beam interference using the compensation factor.

For example, the respective beam physical resource usage rates of the current beam and the another beam are configured to be predicted using the respective historical beam physical resource usage rates of the current beam and the another beam.

For example, the determining the interference loss between the beams according to the compensated beam interference comprises operations for the each compensated beam interference of: determining a single-beam data transmission rate based on using a current beam for single-beam transmission, determining a two-beam pairing data transmission rate based on using the current beam for pairing transmission with another beam, and determining the inter-ference loss between the beams based the current beam being interfered with by the another beam, according to the single-beam data transmission rate and the two-beam pairing data transmission rate.

For example, the determining the inter-beam interference losses of the plurality of beam pairing groups according to the beam priority and the interference loss between the beams comprises selecting a first set number of candidate beams from among the plurality of beams according to the beam priority, for each candidate beam, selecting at least one beam from among other beams with respect to each number of at least one specified number of pairing beam, respectively, according to the interference loss between the beams, to obtain a corresponding beam pairing group, and determining the inter-beam interference loss of each beam pairing group.

For example, for the each candidate beam, selecting the at least one beam from among the other beams with respect to the each number of the at least one specified number of pairing beam, respectively according to the interference loss between the beams, to obtain the corresponding beam pairing group, comprises sorting the interference loss between the beams of a current candidate beam in a descending order and with respect to the each number of the at least one specified number of pairing beam, selecting the at least one beam from among the other beams sequentially, according to the sorted interference loss, to obtain a beam pairing group corresponding to a number of pairing beam.

For example, the determining the inter-beam interference loss of the each beam pairing group comprises with respect to a beam pairing group of which the number of pairing beam is 2, for each beam in the beam pairing group, selecting the interference loss of the current beam based on being interfered with by another beam in the beam pairing group, from among the determined interference loss between the beams, as the inter-beam interference loss of the current beam in the beam pairing group and with respect to a beam pairing group of which the number of pairing beam is greater than 2, for each beam in the beam pairing group: determining a single-beam data transmission rate based on using the current beam for single-beam transmission, determining a beam pairing data transmission rate based on using the beam pairing group for transmission, and determining the interference loss of the current beam based on being interfered with by other beams in the beam pairing group as the inter-beam interference loss of the current beam in the beam pairing group, according to the single-beam data transmission rate and the beam pairing data transmission rate.

For example, the selecting the scheduled beam among the plurality of beams according to the beam priority and the inter-beam interference loss comprises selecting a single-beam with the highest beam priority from among the plurality of beams according to the beam priority, determining a beam pairing priory of each beam pairing group in the plurality of beam pairing groups according to the beam priority and the inter-beam interference loss, and selecting a beam pairing group with the highest beam pairing priority from among the plurality of beam pairing groups, and selecting one with the highest priority from the single-beam with the highest beam priority and the beam pairing group with the highest beam pairing priority as the scheduled beam.

For example, the determining the beam pairing priory of the each beam pairing group in the plurality of beam pairing groups, according to the beam priority and the inter-beam interference loss comprises operations for each of the plurality of beam pairing groups of: determining compensated beam priority of each beam according to the beam priority and corresponding inter-beam interference loss of each beam in the current beam pairing group and determining beam pairing priority of the current beam pairing group according to the compensated beam priority of each beam in the current beam pairing group.

For example, the fully connected network is trained by classifying the UE distribution of the current cell by a clustering algorithm, based on the obtained historical SINRs of UEs, generating a label of at least one UE distribution according to a classification result, and training the fully connected network according to the generated label of the at least one UE distribution.

For example, A method performed by a network node, comprises determining interference loss between beams based on measurement information reported by a user equipment (UE) and a beam physical resource usage rate, determining inter-beam interference losses of a plurality of beam pairing groups based on the interference loss between the beams, and selecting a scheduled beam from among the plurality of beams based on the inter-beam interference loss.

For example, the determining the inter-beam interference losses of the plurality of beam pairing groups based on the interference loss between the beams comprises obtaining beam priority of each of the plurality of beams, selecting a first set number of candidate beams from among the plurality of beams according to the beam priority, for each candidate beam, selecting at least one beam from among other beams with respect to each number of at least one specified number of pairing beams, respectively, according to the interference loss between the beams, to obtain a corresponding beam pairing group, and determining the inter-beam interference loss of each beam pairing group.

For example, the selecting the scheduled beam from among the plurality of beams based on the inter-beam interference loss comprises: selecting a single-beam with the highest beam priority from among the plurality of beams according to the beam priority, determining beam pairing priority of each beam pairing group in the plurality of beam pairing groups according to the beam priority and the inter-beam interference loss, and selecting a beam pairing group with the highest beam pairing priority from among the plurality of beam pairing groups, and selecting one with the highest priority from among the single-beam with the highest beam priority and the beam pairing group with the highest beam pairing priority as the scheduled beam.

For example, a network node, comprises a transceiver and a processor coupled to the transceiver, configured to perform operations according to various embodiments.

For example, an electronic apparatus, comprises at least one processor and at least one memory for storing computer executable instructions, wherein the computer executable instructions, when being executed by the at least one processor, cause the at least one processor to cause the electronic apparatus to perform operations according to various embodiments.

For example, a non-transitory computer-readable storage medium stores instructions, which, when executed by at least one processor, cause the at least one processor to perform operations according to various embodiments.

For example, A method performed by an electronic device of a base station, comprises obtaining beam priority information of a plurality of beams for a plurality of user equipments (UEs), obtaining inter-beam interference information of the plurality of beams, identifying, based on the beam priority information and the inter-beam interference information, one of a plurality of beam pairing sets comprising two or more beams among the plurality of beams, and performing communication with at least one of the plurality of UEs via the identified beam pairing set.

For example, the method further comprises identifying, based on signal to interference plus noise ratio (SINR) information on the plurality of beams, UE distribution information on the plurality of UEs, setting the UE distribution information as input values of a plurality of kernels related to a specified model, and obtaining, based on output values of the plurality of kernels, beam priority information of the plurality of beams.

For example, the method further comprises updating, based on identifying a designated event, the SINR information.

For example, the method further comprises receiving measurement report messages from the plurality of UEs, identifying, based on the measurement report messages, a part of space representing inter-beam interference, identifying, using an interpolation scheme, remaining part of the space based on the part of the space, and obtaining, based on the part of the space and the remaining part of the space, the inter-beam interference information of the plurality of beams.

For example, the method further comprises obtaining, based on the measurement report messages, physical resource block (PRB) usage information on the plurality of beams, changing, based on the PRB usage information, the inter-beam interference information of the plurality of beams, and identifying, based on the changed inter-beam interference information, interference loss information.

For example, the method further comprises identifying first data transmission rate of a single-beam, identifying, based on the changed inter-beam interference information, second data transmission rate of a two-beam pairing, and identifying the interference loss information based on a ratio of the second data transmission rate to the first data transmission rate.

For example, the method further comprises identifying, based on the beam priority information and the interference loss information, the plurality of beam pairing sets. Each of the plurality of beam pairing sets comprises two or more two or more beams among the plurality of beams.

For example, at least one set of the plurality of beam pairing sets comprising two beams is identified based on interference loss information between two beams. At least one set of the plurality of beam pairing sets comprising three beams is identified based on interference loss information between three beams. At least one set of the plurality of beam pairing sets comprising four beams is identified based on interference loss information between three beams.

For example, the method further comprises identifying, based on the beam priority information and the inter-beam interference information, a plurality of indexes related to the plurality of beam pairing sets, wherein the plurality of indexes indicating beam pairing priorities of the plurality of beam pairing sets respectively and identifying, based on the plurality of indexes, one of the plurality of beam pairing sets having the highest index.

For example, the identified beam pairing set includes a first beam and a second beam. The first beam is used for communicating with a first UE of the at least one of the plurality of UEs. The second beam is used for communicating with a second UE of the at least one of the plurality of UEs.

For example, an electronic device of a base station, comprises a transceiver and a processor coupled to the transceiver. The processor is configured to obtain beam priority information of a plurality of beams for a plurality of user equipments (UEs), obtain inter-beam interference information of the plurality of beams, identify, based on the beam priority information and the inter-beam interference information, one of a plurality of beam pairing sets comprising two or more beams among the plurality of beams, and perform communication with at least one of the plurality of UEs via the identified beam pairing set.

For example, the processor is further configured to identify, based on signal to interference plus noise ratio (SINR) information on the plurality of beams, UE distribution information on the plurality of UEs, set the UE distribution information as input values of a plurality of kernels related to a specified model, and obtain, based on output values of the plurality of kernels, beam priority information of the plurality of beams.

For example, the processor is further configured to update based on identifying a designated event, the SINR information.

For example, the processor is further configured to receive measurement report messages from the plurality of UEs, identify, based on the measurement report messages, a part of space representing inter-beam interference, identify, using an interpolation scheme, remaining part of the space based on the part of the space, and obtain, based on the part of the space and the remaining part of the space, the inter-beam interference information of the plurality of beams.

For example, the processor is further configured to obtain, based on the measurement report messages, physical resource block (PRB) usage information on the plurality of beams, change, based on the PRB usage information, the inter-beam interference information of the plurality of beams, and identify, based on the changed inter-beam interference information, interference loss information.

For example, the processor is further configured to identify first data transmission rate of a single-beam, identify, based on the changed inter-beam interference information, second data transmission rate of a two-beam pairing, and identify the interference loss information based on a ratio of the second data transmission rate to the first data transmission rate.

For example, the processor is further configured to identify, based on the beam priority information and the interference loss information, the plurality of beam pairing sets. Each of the plurality of beam pairing sets comprises two or more two or more beams among the plurality of beams.

For example, at least one set of the plurality of beam pairing sets comprising two beams is identified based on interference loss information between two beams. At least one set of the plurality of beam pairing sets comprising three beams is identified based on interference loss information between three beams. At least one set of the plurality of beam pairing sets comprising four beams is identified based on interference loss information between three beams.

For example, the processor is further configured to identify, based on the beam priority information and the inter-beam interference information, a plurality of indexes related to the plurality of beam pairing sets, wherein the plurality of indexes indicating beam pairing priorities of the plurality of beam pairing sets respectively, and identify, based on the plurality of indexes, one of the plurality of beam pairing sets having the highest index.

For example, a non-transitory computer readable storage medium stores one or more programs, the one or more programs including instructions, which, when being executed by a processor of an electronic device with a transceiver, cause the processor to obtain beam priority information of a plurality of beams for a plurality of user equipments (UEs), obtain inter-beam interference information of the plurality of beams, identify, based on the beam priority information and the inter-beam interference information, one of a plurality of beam pairing sets comprising two or more beams among the plurality of beams, and perform communication with at least one of the plurality of UEs via the identified beam pairing set.

In addition, according to various embodiments, an electronic apparatus may also be provided, including: at least one processor; and at least one memory storing computer executable instructions, wherein the computer executable instructions, when being executed by the at least one processor, cause the at least one processor to execute the method performed by the network node as described above.

As an example, the electronic apparatus may be a PC computer, a tablet device, a personal digital assistant, a smart phone, or other devices capable of executing the above set of instructions. Here, the electronic apparatus does not have to be a single electronic apparatus and may also be any device or a collection of circuits that may execute the above instructions (or instruction sets) individually or jointly. The electronic apparatus may also be a part of an integrated control system or a system manager, or may be configured as a portable electronic apparatus interconnected by an interface with a local or remote (e.g., via wireless transmission).

In the electronic apparatus, the processor may include a central processing unit (CPU), a graphics processing unit (GPU), a programmable logic device, a dedicated processor system, a microcontroller, or a microprocessor. As an example and not limitation, the processor may also include an analog processor, a digital processor, a microprocessor, a multi-core processor, a processor array, a network processor, and the like.

The processor may include various processing circuitry and execute instructions or codes stored in the memory, where the memory may also store data. Instructions and data may also be transmitted and received through a network via a network interface device, wherein the network interface device may use any known transmission protocol.

The memory may be integrated with the processor as a whole, for example, RAM or a flash memory is arranged in an integrated circuit microprocessor or the like. In addition, the memory may include an independent device, such as an external disk drive, a storage array, or other storage device that may be used by any database system. The memory and the processor may be operatively coupled, or may communicate with each other, for example, through an I/O port, a network connection, or the like, so that the processor may read files stored in the memory.

In addition, the electronic apparatus may also include a video display (such as a liquid crystal display) and a user interaction interface (such as a keyboard, a mouse, a touch input device, etc.). All components of the electronic apparatus may be connected to each other via a bus and/or a network.

According to various embodiments, there may also be provided a non-transitory computer-readable storage medium storing instructions, wherein the instructions, when executed by at least one processor, cause the at least one processor to execute the above method performed by a network node according to various embodiments. Examples of the computer-readable storage medium here include: Read Only Memory (ROM), Random Access Programmable Read Only Memory (PROM), Electrically Erasable Programmable Read Only Memory (EEPROM), Random Access Memory (RAM), Dynamic Random Access Memory (DRAM), Static Random Access Memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, Hard Disk Drive (HDD), Solid State Drive (SSD), card storage (such as multimedia card, secure digital (SD) card or extremely fast digital (XD) card), magnetic tape, floppy disk, magneto-optical data storage device, optical data storage device, hard disk, solid state disk and any other devices which are configured to store computer programs and any associated data, data files, and data structures in a non-transitory manner, and provide the computer programs and any associated data, data files, and data structures to the processor or the computer, so that the processor or the computer may execute the computer programs. The instructions and the computer programs in the above computer-readable storage mediums may run in an environment deployed in computer equipment such as a client, a host, an agent device, a server, etc. In addition, in one example, the computer programs and any associated data, data files and data structures are distributed on networked computer systems, so that computer programs and any associated data, data files, and data structures are stored, accessed, and executed in a distributed manner through one or more processors or computers.

It should be noted that the terms "first", "second", "third", "fourth", "1", "2" and the like (if exists) in the description and claims of the present disclosure and the above drawings are used to distinguish similar objects, and need not be used to describe a specific order or sequence. It should be understood that data used as such may be interchanged in appropriate situations, so that the embodiments of the present disclosure described here may be implemented in an order other than the illustration or text description.

It should be understood that although each operation step is indicated by arrows in the flowcharts of the embodiments of the present disclosure, an implementation order of these steps is not limited to an order indicated by the arrows. Unless explicitly stated herein, in some implementation scenarios of the embodiments of the present disclosure, the implementation steps in the flowcharts may be executed in other orders according to requirements. In addition, some or all of the steps in each flowchart are based on an actual implementation scenario and may include a plurality of sub steps or stages. Some or all of these sub steps or stages may be executed at the same time, and each sub step or stage in these sub steps or stages may also be executed at different times. In scenarios with different execution times, an execution order of these sub steps or stages may be flexibly configured according to requirements, which is not limited by the embodiment of the present disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

For one or more embodiments, at least one of the components set forth in one or more of the preceding figures may be configured to perform one or more operations, techniques, processes, and/or methods as set forth herein. For example, a processor (e.g., baseband processor) as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The methods according to various embodiments described in the claims and/or the specification of the disclosure may be implemented in hardware, software, or a combination of hardware and software.

When implemented by software, a computer-readable storage medium storing one or more programs (software modules) may be provided. One or more programs stored in such a computer-readable storage medium (e.g., non-transitory storage medium) are configured for execution by one or more processors in an electronic device. The one or more programs include instructions that cause the electronic device to execute the methods according to embodiments described in the claims or specification of the disclosure.

Such a program (e.g., software module, software) may be stored in a random-access memory, a non-volatile memory including a flash memory, a read only memory (ROM), an electrically erasable programmable read only memory (EE-PROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of the above. In addition, respective constituent memories may be provided in a multiple number.

Further, the program may be stored in an attachable storage device that can be accessed via a communication network, such as e.g., Internet, Intranet, local area network (LAN), wide area network (WAN), or storage area network (SAN), or a communication network configured with a combination thereof. Such a storage device may access an apparatus performing an embodiment of the disclosure through an external port. Further, a separate storage device on the communication network may be accessed to an apparatus performing an embodiment of the disclosure.

In the above-described specific embodiments of the disclosure, a component included therein may be expressed in a singular or plural form according to a proposed specific embodiment. However, such a singular or plural expression may be selected appropriately for the presented context for the convenience of description, and the disclosure is not limited to the singular form or the plural elements. Therefore, either an element expressed in the plural form may be formed of a singular element, or an element expressed in the singular form may be formed of plural elements.

Meanwhile, specific embodiments have been described in the detailed description of the disclosure, but it goes without saying that various modifications are possible without departing from the scope of the disclosure.

What is claimed is:

1. A method performed by an electronic device of a base station, comprising:
    obtaining beam priority information of a plurality of beams for a plurality of user equipments (UEs);
    obtaining inter-beam interference information of the plurality of beams;
    identifying, based on the beam priority information and the inter-beam interference information, one of a plurality of beam pairing sets comprising two or more beams among the plurality of beams, wherein the identified beam pairing set includes a first downlink beam and a second downlink beam, the first downlink beam is used for communicating with a first UE of the at least one of the plurality of UEs, and the second downlink beam is used for communicating with a second UE of the at least one of the plurality of UEs; and
    performing communication with at least one of the plurality of UEs via the identified beam pairing set.

2. The method of claim 1, further comprising:
    identifying, based on signal to interference plus noise ratio (SINR) information on the plurality of beams, UE distribution information on the plurality of UEs;
    setting the UE distribution information as input values of a plurality of kernels related to a specified model; and
    obtaining, based on output values of the plurality of kernels, beam priority information of the plurality of beams.

3. The method of claim 2, further comprising:
    updating, based on identifying a designated event, the SINR information.

4. The method of claim 1, further comprising:

receiving measurement report messages from the plurality of UEs;

identifying, based on the measurement report messages, a part of space representing inter-beam interference;

identifying, using an interpolation scheme, remaining part of the space based on the part of the space; and obtaining, based on the part of the space and the remaining part of the space, the inter-beam interference information of the plurality of beams.

5. The method of claim 4, further comprising:

obtaining, based on the measurement report messages, physical resource block (PRB) usage information on the plurality of beams;

changing, based on the PRB usage information, the inter-beam interference information of the plurality of beams; and identifying, based on the changed inter-beam interference information, interference loss information.

6. The method of claim 5, further comprising:

identifying first data transmission rate of a single-beam;

identifying, based on the changed inter-beam interference information, second data transmission rate of a two-beam pairing; and identifying the interference loss information based on a ratio of the second data transmission rate to the first data transmission rate.

7. The method of claim 5, further comprising:

identifying, based on the beam priority information and the interference loss information, the plurality of beam pairing sets, wherein each of the plurality of beam pairing sets comprises two or more two or more beams among the plurality of beams.

8. The method of claim 7, wherein at least one set of the plurality of beam pairing sets comprising two beams is identified based on interference loss information between two beams, wherein at least one set of the plurality of beam pairing sets comprising three beams is identified based on interference loss information between three beams, and wherein at least one set of the plurality of beam pairing sets comprising four beams is identified based on interference loss information between three beams.

9. The method of claim 1, further comprising:

identifying, based on the beam priority information and the inter-beam interference information, a plurality of indexes related to the plurality of beam pairing sets, wherein the plurality of indexes indicating beam pairing priorities of the plurality of beam pairing sets respectively; and identifying, based on the plurality of indexes, one of the plurality of beam pairing sets having the highest index.

10. An electronic device of a base station, comprising:

a transceiver;

at least one processor including processing circuitry and coupled to the transceiver; and a memory storing instructions which, when executed individually and/or collectively by the at least one processor, controls the electronic device to:

obtain beam priority information of a plurality of beams for a plurality of user equipments (UEs), obtain inter-beam interference information of the plurality of beams, identify, based on the beam priority information and the inter-beam interference information, one of a plurality of beam pairing sets comprising two or more beams among the plurality of beams, wherein the identified beam pairing set includes a first downlink beam and a second downlink beam, the first downlink beam is used for communicating with a first UE of the at least one of the plurality of UEs, and the second downlink beam is used for communicating with a second UE of the at least one of the plurality of UEs, and perform communication with at least one of the plurality of UEs via the identified beam pairing set.

11. The electronic device of claim 10, wherein the instructions, when executed individually and/or collectively by the at least one processor, controls the electronic device to:

identify, based on signal to interference plus noise ratio (SINR) information on the plurality of beams, UE distribution information on the plurality of UEs, set the UE distribution information as input values of a plurality of kernels related to a specified model, and obtain, based on output values of the plurality of kernels, beam priority information of the plurality of beams.

12. The electronic device of claim 11, wherein the instructions, when executed individually and/or collectively by the at least one processor, controls the electronic device to update based on identifying a designated event, the SINR information.

13. The electronic device of claim 10, wherein the instructions, when executed individually and/or collectively by the at least one processor, controls the electronic device to:

receive measurement report messages from the plurality of UEs, identify, based on the measurement report messages, a part of space representing inter-beam interference, identify, using an interpolation scheme, remaining part of the space based on the part of the space, and obtain, based on the part of the space and the remaining part of the space, the inter-beam interference information of the plurality of beams.

14. The electronic device of claim 13, wherein the instructions, when executed individually and/or collectively by the at least one processor, controls the electronic device to:

obtain, based on the measurement report messages, physical resource block (PRB) usage information on the plurality of beams, change, based on the PRB usage information, the inter-beam interference information of the plurality of beams, and identify, based on the changed inter-beam interference information, interference loss information.

15. The electronic device of claim 14, wherein the instructions, when executed individually and/or collectively by the at least one processor, controls the electronic device to:

identify first data transmission rate of a single-beam, identify, based on the changed inter-beam interference information, second data transmission rate of a two-beam pairing, and identify the interference loss information based on a ratio of the second data transmission rate to the first data transmission rate.

16. The electronic device of claim 14, wherein the instructions, when executed individually and/or collectively by the at least one processor, controls the electronic device to identify, based on the beam priority information and the interference loss information, the plurality of beam pairing sets, wherein each of the plurality of beam pairing sets comprises two or more two or more beams among the plurality of beams.

17. The electronic device of claim 16, wherein at least one set of the plurality of beam pairing sets comprising two beams is identified based on interference loss information between two beams, wherein at least one set of the plurality of beam pairing sets comprising three beams is identified based on interference loss information between three beams, and wherein at least one set of the plurality of beam pairing sets comprising four beams is identified based on interference loss information between three beams.

18. The electronic device of claim 14, wherein the instructions, when executed individually and/or collectively by the at least one processor, controls the electronic device to:

identify, based on the beam priority information and the inter-beam interference information, a plurality of indexes related to the plurality of beam pairing sets, wherein the plurality of indexes indicating beam pairing priorities of the plurality of beam pairing sets respectively, and identify, based on the plurality of indexes, one of the plurality of beam pairing sets having the highest index.

19. A non-transitory computer readable storage medium storing one or more programs, the one or more programs including instructions, which, when being executed by processing circuitry of an electronic device with a transceiver, cause the processing circuitry to:

obtain beam priority information of a plurality of beams for a plurality of user equipments (UEs), obtain inter-beam interference information of the plurality of beams, identify, based on the beam priority information and the inter-beam interference information, one of a plurality of beam pairing sets comprising two or more beams among the plurality of beams, wherein the identified beam pairing set includes a first downlink beam and a second downlink beam, the first downlink beam is used for communicating with a first UE of the at least one of the plurality of UEs, and the second downlink beam is used for communicating with a second UE of the at least one of the plurality of UEs, and perform communication with at least one of the plurality of UEs via the identified beam pairing set.

* * * * *